US011068906B2

(12) United States Patent
Smith et al.

(10) Patent No.: US 11,068,906 B2
(45) Date of Patent: Jul. 20, 2021

(54) METHODS AND SYSTEM FOR WIRELESS TELECOM FRACKING SHARED ECONOMY

(71) Applicant: Rivada Networks, LLC, Colorado Springs, CO (US)

(72) Inventors: Clint Smith, Warwick, NY (US); Samuel Smith, Warwick, NY (US); Declan Ganley, Galway (IE)

(73) Assignee: Rivada Networks, LLC, Colorado Springs, CO (US)

( * ) Notice: Subject to any disclaimer, the term of this patent is extended or adjusted under 35 U.S.C. 154(b) by 761 days.

(21) Appl. No.: 14/843,072

(22) Filed: Sep. 2, 2015

(65) Prior Publication Data

US 2016/0189167 A1    Jun. 30, 2016

Related U.S. Application Data

(60) Provisional application No. 62/045,061, filed on Sep. 3, 2014.

(51) Int. Cl.
| | | |
|---|---|---|
| *G06Q 40/00* | (2012.01) | |
| *G06Q 30/00* | (2012.01) | |
| *G06Q 40/04* | (2012.01) | |
| *G06Q 50/16* | (2012.01) | |
| *H04M 15/00* | (2006.01) | |

(52) U.S. Cl.
CPC .......... *G06Q 30/018* (2013.01); *G06Q 40/04* (2013.01); *G06Q 50/163* (2013.01); *H04M 15/705* (2013.01); *H04M 15/8083* (2013.01)

(58) Field of Classification Search
CPC .. G06Q 10/08; G06Q 20/203; G06Q 30/0633; G06Q 10/0833
See application file for complete search history.

(56) References Cited

U.S. PATENT DOCUMENTS

| | | | |
|---|---|---|---|
| 8,711,721 B2 | 4/2014 | Smith et al. | |
| 8,717,929 B2 | 5/2014 | Smith et al. | |
| 2008/0222019 A1* | 9/2008 | Stanforth | G06Q 40/00 |
| | | | 705/37 |
| 2010/0145862 A1* | 6/2010 | Chang | G06Q 30/08 |
| | | | 705/80 |

(Continued)

*Primary Examiner* — Mike Anderson
(74) *Attorney, Agent, or Firm* — The Marbury Law Group, PLLC

(57) ABSTRACT

A server computing device may be configured to register a parcel with a component (e.g., another server, etc.) in a dynamic spectrum arbitrage (DSA) system, generate a telecom resource right unit or information structure, and use the generated telecom resource right unit or information structure (e.g., in conjunction with components in the DSA system) to allocate the identified telecommunication resource for access and use by wireless devices that subscribe to a telecommunication network registered with the DSA system. The server computing device may also receive information identifying an amount of the telecommunication resource used within the registered parcel by the wireless devices of the telecommunication network, and use the generated telecom resource right unit or information structure to update a payment account associated with the parcel owner based on the amount of the telecommunication resource used within the registered parcel by the wireless devices that subscribe to the telecommunication network.

15 Claims, 14 Drawing Sheets

(56) References Cited

U.S. PATENT DOCUMENTS

| | | | |
|---|---|---|---|
| 2010/0299274 A1* | 11/2010 | Rappaport | G06F 17/00 705/313 |
| 2012/0238218 A1* | 9/2012 | Stine | H04W 16/00 455/67.11 |
| 2012/0322487 A1* | 12/2012 | Stanforth | H04W 16/14 455/509 |
| 2016/0027112 A1 | 1/2016 | Smith et al. | |

* cited by examiner

METHODS AND SYSTEM FOR WIRELESS TELECOM FRACKING SHARED ECONOMY

RELATED APPLICATIONS

This application claims the benefit of priority to U.S. Provisional Application No. 62/045,061, entitled "Methods and System for Wireless Telecom Fracking Shared Economy" filed Sep. 3, 2014, the entire contents of which are hereby incorporated by reference.

This application is also related to U.S. Pat. No. 8,711,721 entitled "Methods and Systems for Dynamic Spectrum Arbitrage" dated Apr. 29, 2014; U.S. Pat. No. 8,717,929 entitled "Methods and Systems for Dynamic Spectrum Arbitrage" dated May 6, 2014; and U.S. patent application Ser. No. 14/807,975 entitled "Broadband Orthogonal Resource Grouping" filed Jul. 24, 2015, the entire contents of all of which are hereby incorporated by reference for all purposes.

BACKGROUND

The shared economy development is moving from a concept to reality. Telecommunications plays a major role in the development of the shared economy. However the current telecommunications delivery, and the rights associated with it, are based on a non-shared economy scheme.

Currently both fixed and wireless telecommunications have their rights assigned by licenses that have specific geographic boundaries, covering a vast amount of area that is setup following population areas, economic zones or country borders. The telecom license allows for the telecom operator to deliver services in geographic areas regardless of who actually owns the rights to that area. Telecommunication systems, especially wireless telecommunication system, utilize a natural resource as part of the delivery method.

Property ownership has historically defined it as commencing from the center of the earth to the heavens meaning the subsurface, surface and above surface rights for all resources either known or unknown are the associated with the particular parcel.

Property laws do not allow for someone who is not the owner of the property to gain access or utilize the property for pleasure or profit without permission being granted by the landowner. In cases of access being needed rights of way are allowed again with the permission of the landowner.

Mineral rights are an example of how property rights are used when natural resources are involved and the resources are being extracted for profitable use. Mineral rights are typically separated into both surface and subsurface rights. However the basic premise is that property rights extend from the center of the earth and proceed outward. This basic principal is how mineral rights are assigned to a particular property.

The specific mineral or natural resources that are associated with the land can involve both subsurface and surface rights. Within those subsurface and surface rights there is the ability to delineate different types of resources with which access is granted from which those resources can be extracted for use.

Mineral rights and leases are also bought and sold based on the type of natural resources that is being mined or used as is the ability to grant access or right of way for allowing access to obtain that resource.

New found resources have lead to financial speculation about revenue streams achievable from subsurface and surface rights associated with those resources enabling several types of mineral rights to be bought, sold and leased for the same property depending on the natural resource involved.

Because mineral rights enables the right to extract and profit from whatever is under the ground or on the surface of that ground are more and more commonly being separated from land deeds, and in many cases leading to land that is sold with and without various mineral rights.

Currently both fixed and wireless telecommunications have their rights assigned by based licenses which have specific geographic boundaries covering a vast amount of area that is setup following population areas, economic zones or country borders. The telecom license allows for the telecom operator to deliver services in geographic areas regardless of who actually owns the rights to that area. Telecommunications, especially wireless utilizes a natural resource as part of the delivery method.

However the property owner for the parcel of land through which telecommunication services is being delivered does not participate currently in the financial benefits of the wireless service that is accessible on their property.

SUMMARY

The various aspects include methods of providing telecomm resource rights to property owners, including registering (via a processor of a server computing device) a parcel with a component in a dynamic spectrum arbitrage (DSA) system, generating a TRR information structure that includes information identifying a parcel owner and a telecommunication resource that is offered for allocation and use with respect to an area within the registered parcel, allocating the identified telecommunication resource for access and use by wireless devices of a telecommunication network, receiving information identifying an amount of the telecommunication resource used within the registered parcel by the wireless devices of the telecommunication network, and updating a payment account associated with the parcel owner identified in the TRR information structure based on the amount of the telecommunication resource used within the registered parcel by the wireless devices of the telecommunication network.

In an aspect, the method may include using the generated TRR information structure to offer a telecomm resource right for the use of the identified telecommunication resource with respect to the registered parcel for purchase, lease, or trade on a commodities exchange. In a further aspect, generating the TRR information structure that includes information identifying the parcel owner and the amount of the telecommunication resource that is offered for allocation and use with respect to the area within the registered parcel includes generating the TRR information structure to identify the amount of the telecommunication resource that is offered for allocation and use with respect to the entire parcel. In a further aspect, generating the TRR information structure that includes information identifying the parcel owner and the amount of the telecommunication resource that is offered for allocation and use with respect to the area within the registered parcel includes generating a plurality of TRR information structures that each includes information identifying a subset of the amount of the telecommunication resource offered for allocation and use with respect to an geographic area encompassing one cubic meter. In a further aspect, the method may include selecting a combination of TRR information structures to cover a volume that encompasses a right of way or easement corridor through a series of registered properties, and offering the selected combination of TRR information structures for purchase, lease, or trade on a commodities exchange.

In a further aspect, the method may include performing telecommunications commodity exchange operations that include establishing a communication link between a communications server and a first communication network that includes the telecommunication resource identified in the TRR information structure, determining in the communications server whether the telecommunication resource is available for allocation based on information received via the communication link, broadcasting a communication signal that includes information suitable for informing a plurality of communication networks that the telecommunication resource is available for allocation via an auction and including an auction start time for the auction, receiving bids from the plurality of communication networks for the telecommunication resource determined to be available for allocation in response to broadcasting the communication signal and after the auction start time included in the broadcast communication signal, allocating the telecommunication resource of the first communication network for access and use by a second communication network in the plurality of communication networks based on accepted bids, sending a communication message to the second communication network, the communication message including information suitable for informing the second communication network that use of the allocated telecommunication resource may begin, recording a transaction in a transaction database identifying the telecommunication resource as being allocated for use by the second communication network, and transmitting another communication message that includes information identifying locations and amounts of the telecommunication resource used by the wireless devices in the second communication network.

In a further aspect, the method may include performing DSA operations that include establishing a first communication link between a communications server and a first server in a first communication network, establishing a second communication link between the communications server and a second server in a second communication network, receiving in the communications server a request for telecommunication resources from the second server, determining in the communications server an amount of telecommunication resources available for allocation within the first communication network, allocating a portion of the available telecommunication resources of the first communication network for access and use by multiple cell sites in the second communication network, informing the second server that use of allocated telecommunication resources may begin, and transmitting a communication message that includes information identifying locations and amounts of the telecommunication resource used by the wireless devices in the second communication network.

In a further aspect, the method may include performing DSA operations that include establishing a first communication link between a communications server and a first server in a first communication network for a wireless device to connect with the first communication network, establishing a second communication link between the communications server and a second server in a second communication network for the wireless device to connect with the second communication network, receiving in the communications server a request for RF spectrum resources from the second server, sending a query message from the communications server to the first server in the first communication network and at least one other server in another communication network based on a pre-defined criteria including a type, capability, and geographic criterion of the wireless device in response to the communications server receiving the request for RF spectrum resources from the second server, receiving a message in the communications server from the first server in response to sending the query message, the received message identifying an amount of first communication network RF spectrum resources available for reallocation, pooling the first communication network RF spectrum resources identified in the received message and RF spectrum resources of at least one other communication network, allocating by the communications server the pooled resources for access and use by multiple cell sites in the second communication network, informing the second server that use of allocated RF spectrum resources may begin for the wireless device to establish a communication connection with the second communication network, and transmitting a communication message that includes information identifying a location and an amount of RF spectrum resources used by the wireless device.

Further aspects include a server computing device that includes a processor configured with processor-executable instructions to perform operations including registering a parcel with a component in a dynamic spectrum arbitrage (DSA) system, generating a TRR information structure that includes information identifying a parcel owner and a telecommunication resource that is offered for allocation and use with respect to an area within the registered parcel, allocating the identified telecommunication resource for access and use by wireless devices of a telecommunication network, receiving information identifying an amount of the telecommunication resource used within the registered parcel by the wireless devices of the telecommunication network, and updating a payment account associated with the parcel owner identified in the TRR information structure based on the amount of the telecommunication resource used within the registered parcel by the wireless devices of the telecommunication network.

In an aspect, the processor may be configured with processor-executable instructions to perform operations further including using the generated TRR information structure to offer a telecomm resource right for the use of the identified telecommunication resource with respect to the registered parcel for purchase, lease, or trade on a commodities exchange. In an aspect, the processor may be configured with processor-executable instructions to perform operations such that generating the TRR information structure that includes information identifying the parcel owner and the amount of the telecommunication resource that is offered for allocation and use with respect to the area within the registered parcel includes generating the TRR information structure to identify the amount of the telecommunication resource that is offered for allocation and use with respect to the entire parcel.

In a further aspect, the processor may be configured with processor-executable instructions to perform operations such that generating the TRR information structure that includes information identifying the parcel owner and the amount of the telecommunication resource that is offered for allocation and use with respect to the area within the registered parcel includes generating a plurality of TRR information structures that each includes information identifying a subset of the amount of the telecommunication resource offered for allocation and use with respect to an geographic area encompassing one cubic meter. In a further aspect, the processor may be configured with processor-executable instructions to perform operations further including selecting a combination of TRR information structures to cover a volume that encompasses a right of way or easement corridor through a series of registered properties, and offering the selected combination of TRR information structures for purchase, lease, or trade on a commodities exchange.

In a further aspect, the processor may be configured with processor-executable instructions to perform operations that further include performing telecommunications commodity exchange operations that include establishing a communication link to a first communication network that includes the telecommunication resource identified in the TRR information structure, determining whether the telecommunication resource is available for allocation based on information received via the communication link, broadcasting a communication signal that includes information suitable for informing a plurality of communication networks that the telecommunication resource is available for allocation via an auction and including an auction start time for the auction, receiving bids from the plurality of communication networks for the telecommunication resource determined to be available for allocation in response to broadcasting the communication signal and after the auction start time included in the broadcast communication signal, allocating the telecommunication resource of the first communication network for access and use by a second communication network in the plurality of communication networks based on accepted bids, sending a communication message to the second communication network, the communication message including information suitable for informing the second communication network that use of the allocated telecommunication resource may begin, recording a transaction in a transaction database identifying the telecommunication resource as being allocated for use by the second communication network, and transmitting another communication message that includes information identifying locations and amounts of the telecommunication resource used by the wireless devices in the second communication network.

In a further aspect, the processor may be configured with processor-executable instructions to perform operations that further include performing DSA operations that include establishing a first communication link to a first server in a first communication network, establishing a second communication link to a second server in a second communication network, receiving a request for telecommunication resources from the second server, determining an amount of telecommunication resources available for allocation within the first communication network, allocating a portion of the available telecommunication resources of the first communication network for access and use by multiple cell sites in the second communication network, informing the second server that use of allocated telecommunication resources may begin, and transmitting a communication message that includes information identifying locations and amounts of the telecommunication resource used by the wireless devices in the second communication network.

In a further aspect, the processor may be configured with processor-executable instructions to perform operations further including performing DSA operations that include establishing a first communication link to a first server in a first communication network for a wireless device to connect with the first communication network, establishing a second communication link to a second server in a second communication network for the wireless device to connect with the second communication network, receiving a request for RF spectrum resources from the second server, sending a query message to the first server in the first communication network and at least one other server in another communication network based on a pre-defined criteria including a type, capability, and geographic criterion of the wireless device in response to receiving the request for RF spectrum resources from the second server, receiving a message from the first server in response to sending the query message, the received message identifying an amount of first communication network RF spectrum resources available for reallocation, pooling the first communication network RF spectrum resources identified in the received message and RF spectrum resources of at least one other communication network, allocating the pooled resources for access and use by multiple cell sites in the second communication network, informing the second server that use of allocated RF spectrum resources may begin for the wireless device to establish a communication connection with the second communication network, and transmitting a communication message that includes information identifying a location and an amount of RF spectrum resources used by the wireless device.

Further aspects include a non-transitory computer readable storage medium having stored thereon processor-executable software instructions configured to cause a processor in a server computing device to perform operations that may include registering a parcel with a component in a dynamic spectrum arbitrage (DSA) system, generating a TRR information structure that includes information identifying a parcel owner and a telecommunication resource that is offered for allocation and use with respect to an area within the registered parcel, allocating the identified telecommunication resource for access and use by wireless devices of a telecommunication network, receiving information identifying an amount of the telecommunication resource used within the registered parcel by the wireless devices of the telecommunication network, and updating a payment account associated with the parcel owner identified in the TRR information structure based on the amount of the telecommunication resource used within the registered parcel by the wireless devices of the telecommunication network.

In an aspect, the stored processor-executable software instructions may be configured to cause a processor to perform operations further including using the generated TRR information structure to offer a telecomm resource right for the use of the identified telecommunication resource with respect to the registered parcel for purchase, lease, or trade on a commodities exchange. In a further aspect, the stored processor-executable software instructions may be configured to cause a processor to perform operations such that generating the TRR information structure that includes information identifying the parcel owner and the amount of the telecommunication resource that is offered for allocation and use with respect to the area within the registered parcel includes generating the TRR information structure to identify the amount of the telecommunication resource that is offered for allocation and use with respect to the entire parcel.

In a further aspect, the stored processor-executable software instructions may be configured to cause a processor to perform operations such that generating the TRR information structure that includes information identifying the parcel owner and the amount of the telecommunication resource that is offered for allocation and use with respect to the area within the registered parcel includes generating a plurality of TRR information structures that each includes information identifying a subset of the amount of the telecommunication resource offered for allocation and use with respect to an geographic area encompassing one cubic meter.

In a further aspect, the stored processor-executable software instructions may be configured to cause a processor to perform operations further including selecting a combination of TRR information structures to cover a volume that encompasses a right of way or easement corridor through a series of registered properties, and offering the selected combination of TRR information structures for purchase, lease, or trade on a commodities exchange.

In a further aspect, the stored processor-executable software instructions may be configured to cause a processor to perform operations further including performing telecommunications commodity exchange operations that include establishing a communication link to a first communication network that includes the telecommunication resource identified in the TRR information structure, determining whether the telecommunication resource is available for allocation based on information received via the communication link, broadcasting a communication signal that includes information suitable for informing a plurality of communication networks that the telecommunication resource is available for allocation via an auction and including an auction start time for the auction, receiving bids from the plurality of communication networks for the telecommunication resource determined to be available for allocation in response to broadcasting the communication signal and after the auction start time included in the broadcast communication signal, allocating the telecommunication resource of the first communication network for access and use by a second communication network in the plurality of communication networks based on accepted bids, sending a communication message to the second communication network, the communication message including information suitable for informing the second communication network that use of the allocated telecommunication resource may begin, recording a transaction in a transaction database identifying the telecommunication resource as being allocated for use by the second communication network, and transmitting another communication message that includes information identifying locations and amounts of the telecommunication resource used by the wireless devices in the second communication network.

In a further aspect, the stored processor-executable software instructions may be configured to cause a processor to perform operations further including performing DSA operations that include establishing a first communication link to a first server in a first communication network, establishing a second communication link to a second server in a second communication network, receiving a request for telecommunication resources from the second server, determining an amount of telecommunication resources available for allocation within the first communication network, allocating a portion of the available telecommunication resources of the first communication network for access and use by multiple cell sites in the second communication network, informing the second server that use of allocated telecommunication resources may begin, and transmitting a communication message that includes information identifying locations and amounts of the telecommunication resource used by the wireless devices in the second communication network.

In a further aspect, the stored processor-executable software instructions may be configured to cause a processor to perform operations further including performing DSA operations that include establishing a first communication link to a first server in a first communication network for a wireless device to connect with the first communication network, establishing a second communication link to a second server in a second communication network for the wireless device to connect with the second communication network, receiving a request for RF spectrum resources from the second server, sending a query message to the first server in the first communication network and at least one other server in another communication network based on a predefined criteria including a type, capability, and geographic criterion of the wireless device in response to receiving the request for RF spectrum resources from the second server, receiving a message from the first server in response to sending the query message, the received message identifying an amount of first communication network RF spectrum resources available for reallocation, pooling the first communication network RF spectrum resources identified in the received message and RF spectrum resources of at least one other communication network, allocating the pooled resources for access and use by multiple cell sites in the second communication network, informing the second server that use of allocated RF spectrum resources may begin for the wireless device to establish a communication connection with the second communication network, and transmitting a communication message that includes information identifying a location and an amount of RF spectrum resources used by the wireless device.

BRIEF DESCRIPTION OF THE DRAWINGS

The accompanying drawings, which are incorporated herein and constitute part of this specification, illustrate exemplary embodiments of the invention, and, together with the general description given above and the detailed description given below, serve to explain features of the invention.

DETAILED DESCRIPTION

Figure 1:
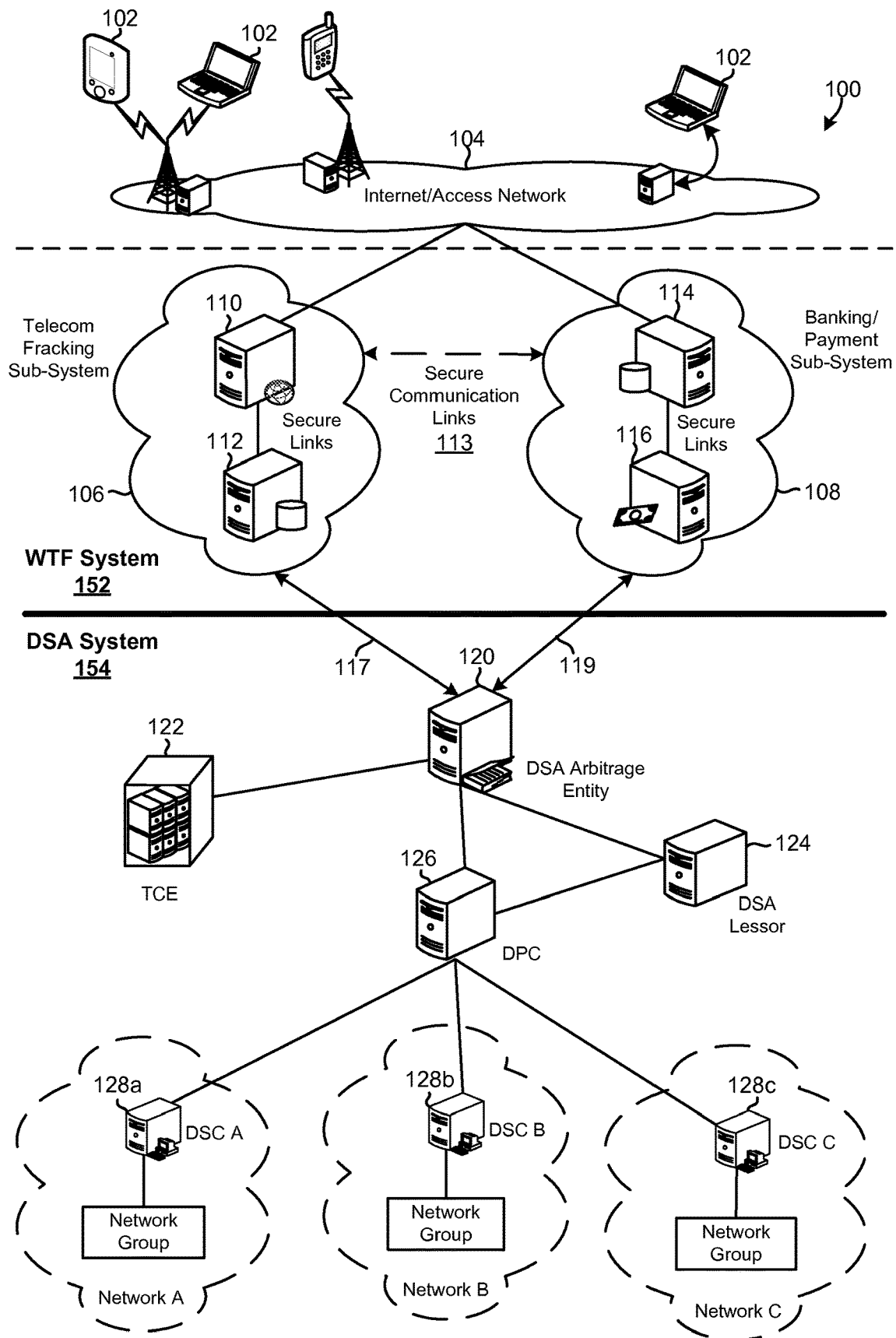
FIG. 1 is a communication system block diagram of an example communication system that may be used to implement the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

In overview, the various embodiments include methods, and server computing devices configured to implement the methods, of providing telecomm resource rights to property owners. A server computing device may be configured to register a parcel with a component (e.g., another server) in a dynamic spectrum arbitrage (DSA) system, and generate a telecom resource right unit or information structure that includes information identifying the owner of the registered parcel, one or more areas within the parcel, telecommunication resources offered for allocation and use within the areas/parcel, and other similar information. The server computing device may use the generated telecom resource right unit or information structure (e.g., in conjunction with components in the DSA system) to allocate the identified telecommunication resource for access and use by wireless devices that subscribe to a telecommunication network registered with the DSA system. The server computing device may receive information identifying an amount of the telecommunication resource used within the registered parcel by the wireless devices of the telecommunication network, and update a payment account associated with the parcel owner identified in the telecom resource right unit or information structure based on the amount of the telecommunication resource used within the registered parcel by the wireless devices of the telecommunication network. Generating and using telecom resource right units (or information structures) in accordance with the various embodiments disclosed in this application may improve the performance, efficiency and functioning of the telecommunication system and the DSA system, as well as the components and computing devices in the telecommunication and/or DSA systems.

Various embodiments provide telecommunication systems, servers and methods that enable a property owner to actively participate in the financial benefits of the wireless service that is accessible on their property referred to as telecom resource rights (TRR). Various embodiments provide the telecommunication systems that enable property owners with telecom resource rights to have a say in the delivery of telecom services over, in, through, or within their property. Various embodiments also provide the telecommunication systems that enable such telecom resource rights to be bought, sold and traded to third parties, similar to the way timber or mineral rights may be bought, sold and traded.

Various embodiments may include components (e.g., server computing devices) configured to generate, create, allocate, and use telecom resource right units (which may be information structures, etc.). In some embodiments, the components may be configured to use the use telecom resource right units to create, allocate, and utilize telecom resource rights, such as a property owner's right to control the propagation of radio waves over a parcel of land. The components may also be configured to perform various operations to allow the telecom resource right units to be bought, sold and traded.

Various embodiments may utilize a dynamic spectrum arbitrage (DSA) system configured to dynamically manage the availability, allocation, access, and use of telecommunication resources, such as radio frequency (RF) spectrum resources, between participating networks. In overview, the DSA system allows two or more networks (e.g., lessor and lessee networks) to collaborate and make better use their resources by leasing resources during times of high congestion and leasing out resources when they are not in use. For example, the DSA system may include components configured to determine resources are available (e.g., not in use) in a first telecommunication network, conduct an auction for the available resources among participating networks, select a second telecommunication network to which the available resources are to be allocated, and allocate the available resources of the first telecommunication network for access and use by wireless devices associated with the second telecommunication network. A detailed description of an example DSA system is provided in U.S. Pat. No. 8,711,721 entitled "Methods and Systems for Dynamic Spectrum Arbitrage" dated Apr. 29, 2014, the entire contents of which are hereby incorporated by reference in their entirety and for all purposes.

In some embodiments, the DSA system may include or communicate with a telecommunications commodity exchange (TCE) component that is configured to use the features provided by the DSA system to conduct or manage the auction for the available resources. A detailed description of an example TCE system/component is provided in U.S. Pat. No. 8,717,929 entitled "Methods and Systems for Dynamic Spectrum Arbitrage" dated May 6, 2014, the entire contents of which are hereby incorporated by reference in their entirety and for all purposes.

In some embodiments, the TCE component may be configured to allow participating networks, investors, speculators, and new entrants (collectively "participants") to buy, sell, exchange, and invest in telecommunication resources. For example, in an embodiment, the TCE component may be configured to pool resources made available by multiple networks and conduct a resource auction for all or portions of the resources in the resource pool. As part of these operations, the TCE component may receive resource bids from multiple participants, identify the participant that submitted highest bid as the winner of the resource auction, and allocate the auctioned resources to the winning participant. As such, the TCE component may allow participating networks to make more efficient use of their excess resources (i.e., resources that would otherwise go unused for significant periods of time), such as by allowing them to sell or lease these resources to the highest bidder. The TCE component may also allow participating networks to lease resources from other networks at competitive market rates that more accurately reflect the economic principles of supply and demand.

In addition, in some embodiments, the TCE component may be configured to allow participants to invest in future allocations of the telecommunication resources. For example, the TCE component may be configured to allow a participant to buy or sell futures contracts in RF spectrum. Such futures contracts may provide an assurance that a lessor network will allocate a specified quantity of RF spectrum to a lessee network at a future date for a presently agreed upon price. This, in turn, allows the lessee network to better manage or hedge against future costs, or to speculate regarding future increases or decreases in the costs or demand for RF spectrum resources.

To accomplish the above functions, the TCE component (or another component in the DSA system) may be configured to measure, pool, divide, offer for sale/lease, and distribute telecommunication resources. Each telecommunication resource may be (or may include) any signal, element, component, or system that is used by participating networks to communicate information wirelessly or over the air. For example, a telecommunication resource may include all or portions of the electromagnetic spectrum (e.g., radio frequency spectrum, microwave spectrum, etc.), a frequency or frequency range, a frequency band, a channel, bandwidth, a stream, a transmission path, a communication link, carriers, sub-carriers, frames, superframes, samples, cells, etc. A telecommunication resource may also include all or portions of the functions, operations, or services provided by radio towers, cell sites, base stations, eNodeBs, and other well-known network components.

Due to the variance, variety, and complexity of the telecommunication resources, it is often challenging to represent, express, or offer telecommunication resources in uniform quantities or units that investors and other participants can readily understand. It is also challenging to properly quantify, assess, or compare the relative economic values of telecommunication resources. For example, telecommunication resources are typically associated with a physical or semi-physical resource boundary, such as a cell site, coverage area, a license area, subset of a license area, etc. Such resource boundaries may vary based on the resource, the network, or the allocation scheme used for allocating the resource. As such, existing solutions require that the DSA system use polygons to define the geographic areas in which the wireless devices of the lessee network are authorized to use an allocated resource. Yet, the polygons that are generated using existing solutions are not well suited for use in representing telecommunication resources in a commodities exchange system. This is because, while such polygons reduce the variability of the geographic boundaries, the shape and size of the polygons may still differ based on the resource, the network, or the allocation scheme used to allocate the resource. These differences increase the computational complexity associated with appraising or comparing different resource offerings from different networks, and make it more challenging to determine the relative economic value of a telecommunication resource that is offered for sale or lease.

These and other challenges may discourage or detract investors from investing in or trading telecommunication resources alongside more traditional commodities, such as gold, oil, or natural gas. These challenges may also limit the DSA system's ability to efficiently offer telecommunication resources for purchase, lease, or trade as a commodity.

To better support the trade of telecommunication resources as a commodity, the various embodiments include components (e.g., network servers, etc.) configured to identify, define, quantify, pool, partition, organize, and/or package telecommunication resources into well-defined, granular, discrete, standardized, and fungible resource units, and track those resources as they travel/propagate through various properties so that property owners can have a say in, and benefit from, the use of their property for the delivery of telecommunication services. In some embodiments, the resource units may be bandwidth units (BUs). Detailed descriptions of example resource units are provided in U.S. patent application Ser. No. 14/807,975 entitled "Broadband Orthogonal Resource Grouping" filed Jul. 24, 2015, the entire contents of which are hereby incorporated by reference in their entirety and for all purposes.

The various embodiments include methods, and computing devices configured to implement the methods, for using resource units, in conjunction with the DSA-TCE system, so as to enable property owners to actively participate in the financial benefits of the wireless services that are accessible on their property, effectively providing them with telecom resource rights. The various embodiment systems, servers and methods enable telecom resource rights to be packaged into telecom resource right units (TRRs) that may be bought, sold and traded to third parties.

TRRs may be information structures that include information about a property owner's property rights with respect to the access and use of telecommunication resources with respect to a parcel or property. These units may be used to create telecom resource rights that follow a similar concept as that which is available for other property rights, such as mineral rights, timber rights, etc., and may provide property owners with the right to control or be compensated for the telecom services that are delivered over their properties or parcels of land.

In an embodiment, a wireless telecom database server may be configured to interact with the DSA arbitrage entity to obtain wireless lease information. A wireless telecom portal may be configured to facilitate the registration of a parcel (or several parcels) of land so that it forms the basis of a telecom resource right. The portal may also be configured to forward the property owners credentials (including the parcel particulars) to a wireless telecom fracking database (which includes a repository of all registrations) to create a resource unit or TRR. The DSA arbitrage entity may be configured to access the wireless telecom fracking database so that it can cross correlate the registered parcels of land (or TRRs) to grids (e.g., bid grids, etc.), which are generated and used as part of the DSA process for leasing (or dynamically allocating) telecommunication resources.

FIG. 1 illustrates various components and communication links in a system 100 configured to create, monetize, and use telecom resource rights in accordance with the various embodiments so as to enable owners of such telecom resource rights to financially benefit from the wireless services being delivered on, via, over or through their properties. In the example illustrated in FIG. 1, the system 100 includes a property owner device 102, a wireless telecom fracking (WTF) system 152, and a DSA system 154. The property owner device 102 may be a computing device (e.g., mobile computing device, etc.) that is used by a property owner or an agent of an entity that owns (or intends to claim, generate or acquire) telecom resource rights with respect to one or more parcels (e.g., parcels of land, etc.).

The WTF system 152 may include a telecom fracking sub-system 106 and a banking/payment sub-system 108. The DSA system 154 may include a DSA lessee component (not illustrated separately in FIG. 1), DSA arbitrage entity component 120, a TCE component 122, DSA lessor component 124, a DPC component 126, and DSC components 128a-c. In some embodiments, the DSA system 154 may also include telecom resource rights correlator (TRR correlator) component (not illustrated in FIG. 1). In some embodiments, the TRR correlator component may be included in, or implemented as part of, the DSA arbitrage entity component 120. In some embodiments, the TRR correlator component may be implemented as a separate platform and/or independent of the DSA arbitrage entity component 120.

The property owner device 102, telecom fracking sub-system 106, and banking/payment sub-system 108 may communicate with each other via the Internet or an access network 104. Components in the telecom fracking sub-system 106 may communicate with components in the DSA system 154, such as a DSA Arbitrage entity component 120, via first secure communication links 117. Components in the banking/payment sub-system 108 may communicate with components in the DSA system 154 via second secure communication links 119. In some embodiments, components in the telecom fracking sub-system 106 may be configured to communicate with components in the banking/payment sub-system 108 via third secure communication links 113.

The property owner device 102 may be configured to render various input screens (e.g., via an electronic display), receive user inputs (e.g., via input keys, keyboard, etc.), process the received user inputs to determine, identify, format or generate TRR-related information (e.g., property information, registration information, credentials, financial information, ownership information, etc.), and send TRR-related information to the telecom fracking sub-system 106 and/or the banking/payment sub-system 108. The telecom fracking sub-system 106 may be configured to receive and use TRR-related information to authenticate a property owner, verify that the property owner has rights to a parcel of land, register a particular parcel of land (or multiple parcels of land) with the system 100, create a telecom resource right (TRRs) based on a registered parcel, and perform other similar operations. The banking/payment sub-system 108 may be configured to receive and use the TRR-related information to create or monetize a telecom resource right (TRR), determine or generate payment/charging information, update charging/banking/financial accounts (e.g., by updating information stored in a database, etc.), and perform other similar operations. In some embodiments, a telecom resource right (TRR) may be an information structure or unit that includes information identifying a property owner, a property/parcel, a telecommunication resource, a lessor, a lessee, a resource/bid grid, various network components, etc. In some embodiments, the TRR may be associated with all or portions of a bid, bid area, and/or bid information.

The telecom fracking sub-system 106 may include a telecom fracking web/portal component 110 and a wireless telecom database component 112, which may include a repository of property/parcel registrations. The telecom fracking web/portal component 110 may be configured to communicate with the wireless telecom database component 112 and perform various operations to allow land owners to register the parcel(s) and/or create telecom resource rights (TRRs) based on registered parcels. For example, the telecom fracking web/portal component 110 may be configured to receive (e.g., from the property owner device 102) owner credentials and property information that identifies a parcel and its particulars, and forward this information to the wireless telecom database component 112 for storage, authentication, comparison and/or analysis (e.g., based on the information stored in the repository of property/parcel registrations, etc.).

The banking/payment sub-system 108 may include a banking/charging component 114 and a social economic payment component 116. As mentioned above, telecom resource rights (TRRs) associated with the bid information may include the entire bid or part of the bid area. In the case of a partial coverage of TRRs to the bid, a prorated payment may be calculated by the economic payment component 116. Additionally, the particular percentage of the lease for payment to the owners of the TRRs may be calculated by the economic payment component 116. Thus, the economic payment component 116 may be configured to compute, calculate, or determine a prorated payment and/or a percentage of a lease that is to be paid to a property owner or owner of a TRR.

The DSA arbitrage entity component 120 may be configured to communicate with the wireless telecom database component 112 to access and use the information stored/managed by the wireless telecom database component 112. For example, the DSA arbitrage entity component 120 may receive and use information stored in the repository of property/parcel registrations to cross correlate registered parcels of land (or TRRs, etc.) to one or more resource/bid grids. Each resource/bid grid may be information structure that includes information identifying an area in relation to a telecommunication resource. Such grids may be generated, determined or used by the DSA system 154 as part of conventional DSA operations (e.g., allocating resources of a first network for access and use by devices in a second network, conducting resource auctions, generating resource leases, etc.).

The DPC component 126 may send communication messages to the DSA arbitrage entity component 120 to inform it of various events, such as a lease conclusion event that occurs at the conclusion of a leasing process, after the termination of a resource lease, after resources that are allocated to another network are returned, etc. In response, the DSA arbitrage entity component 120 may send TRR-related information (e.g., a TRR or telecom resource rights associated with a bid, bid information, all or a portion of the bid area, bid criteria, grid information, usage information, etc.) to the social economic payment component 116 in the banking/payment sub-system 108 for processing, analysis, and use.

The economic payment component 116 may receive and use the TRR-related information to determine a prorated payment and/or a percentage of a lease that is to be paid to a property owner or owner of a TRR. Upon completion of the payment calculations, the economic payment component 116 may enable, transmit, or conduct a wire transfer to the owner of the relevant property/parcel and/or to owner of the TRRs associated with the relevant property/parcel, which may be accomplished by sending a communication message that includes financial or payment information to the banking/charging component 114.

In some embodiments, the DSA system 154 and its components (e.g., TCE component 122) may be enablers for the creation and unitization of telecom resource rights via the creation and use of telecommunication resource right units (TRRs).

Figure 2:
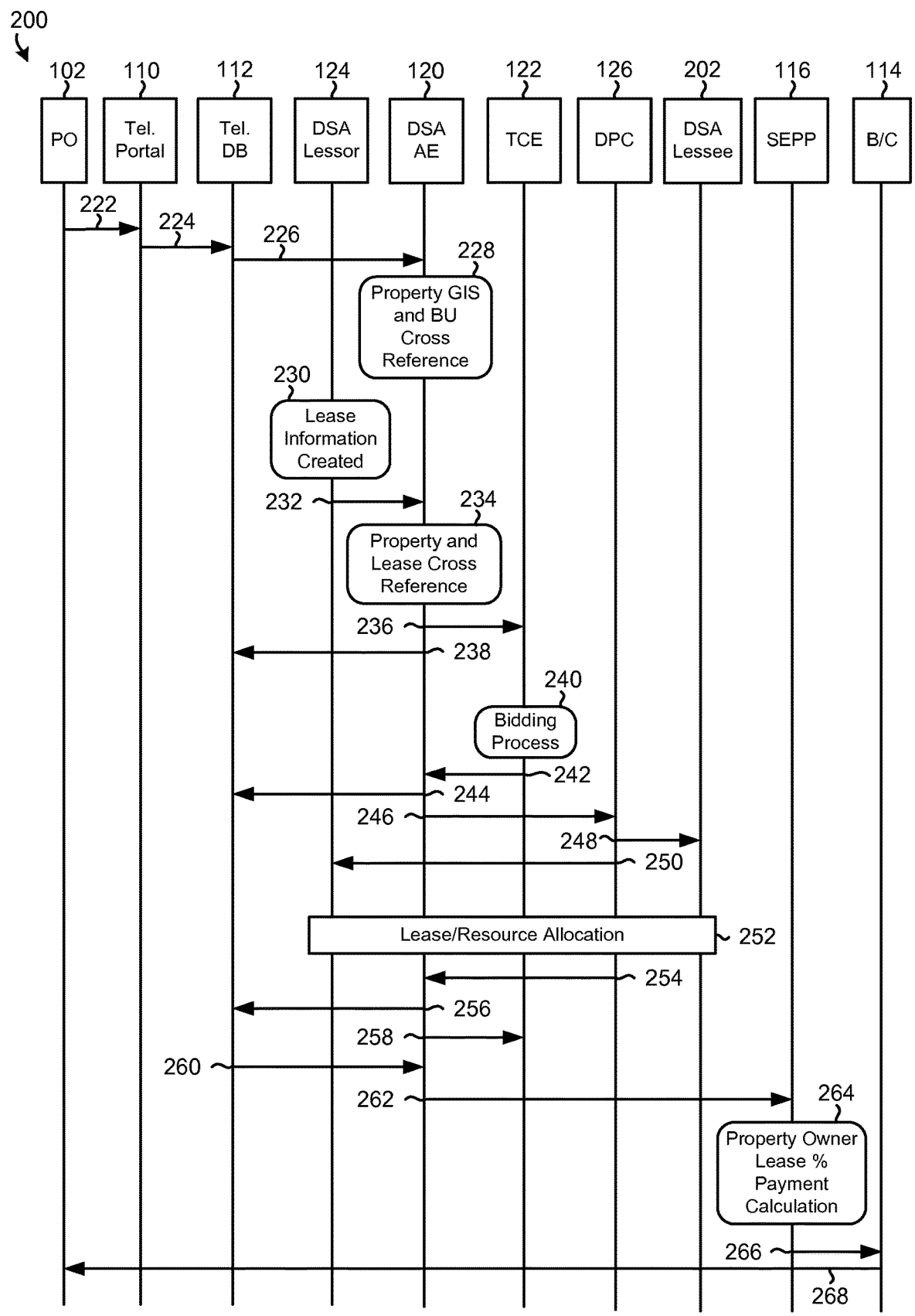
FIGS. 2-4 are communication flow and process flow diagrams of communications and operations for implementing various embodiments.

FIG. 2 illustrates information flows and communications between various components in an embodiment system 200 configured to allow a property owner to register their property so that is part of the DSA leasing process, and enable the property owner or the telecom resource rights owner to obtain financial compensation for the delivery of wireless services on the parcel of land for which they have the telecom resource rights. In the example illustrated in FIG. 2, the system 200 includes a property owner device (PO) 102, a wireless telecom fracking web/portal component (Tel. Portal) 110, a wireless telecom database component (wireless telecom fracking database or Tel. DB) 112, a DSA lessor component 124, a DSA arbitrage entity component (DSA AE) 120, a TCE component 122, a DPC component 126, a DSA lessee component 202 (which may include, or included in, a DSC component 128), a social economic payment component (SEPP) 116, and a banking/charging component (B/C) 114.

In operation 222, the property owner device 102 may receive, generate, and/or send TRR-related information that identifies a property owner registered property to the telecom fracking web/portal component 110. In operation 224, the telecom fracking web/portal component 110 may receive and use the TRR-related information to authenticate and verify the property owner, determine/retrieve property owner credentials, and send the TRR-related information and/or property owner credentials to the wireless telecom database component 112. In operation 226, the wireless telecom database component 112 may receive and use the information to determine whether the property/parcel identified in the TRR-related information is registered with the system (e.g., included in the repository, identifies a valid property or right, etc.), optionally register the property, update the TRR-related information with property registration information, and send all or portions of the updated TRR-related information (e.g., property registration information, etc.) to the DSA arbitrage entity component 120. In operation block 228, the DSA arbitrage entity component 120 may receive and use the TRR-related information (e.g., property registration information, etc.) to determine, analyze, or cross correlate registered parcels of land (or TRRs, bandwidth units (BUs), etc.) to one or more resource/bid grids. In addition, in operation block 228, the DSA arbitrage entity component 120 may perform other similar operations, such as property GIS operations or BU cross reference operations.

In operation block 230, the DSA lessor component 124 may generate, create, or retrieve lease information, which may include lease credentials, lease ID, etc. In operation 232, the DSA lessor component 124 may send the lease information to the DSA arbitrage entity component 120. In operation block 234, the DSA arbitrage entity component 120 may receive and use the lease information to determine, analyze and/or cross reference the property identified in the TRR-related information to the lease information received from the DSA lessor component 124. For example, in operation block 234, the DSA arbitrage entity component 120 may correlate a lease ID to a property owner ID, generate a data entry that identifies the correlation between the lease ID and the property owner ID, and update the TRR-related information with the generated data entry/collation information. In operation 236, the DSA arbitrage entity component 120 may send all or portions of the updated TRR-related information (e.g., the data entry, results of the cross referencing operations, lease credentials, etc.) to the TCE component 122. In addition, in operation 238, the DSA arbitrage entity component 120 may send all or portions of the updated TRR-related information (e.g., lease ID, property owner ID, etc.) to the wireless telecom database component 112 for storage (e.g., in the parcel repository, etc.) or updating of records.

In operation block 240, the TCE component 122 may conduct a telecommunications commodity exchange or resource auction, which may include performing auction/bidding operations, methods, or process. For example, the TCE component 122 may determine whether a telecommunication resource of the first communication network is available for allocation, broadcast a communication signal that includes information suitable for informing a plurality of communication networks that the telecommunication resource is available for allocation via an auction (and an auction start time for the auction, etc.), receive bids from the communication networks (e.g., in response to broadcasting the communication message, after the auction start time included in the broadcast communication signal, etc.), accept only the bids received from authorized networks (i.e., networks determined to be eligible to participate in the auction), mark a telecommunication resource of a first communication network for lease, purchase, allocation, access, or use access and use by wireless devices in a second communication network (determined based on the accepted bids), send a communication message to the second communication network that informs the second communication network of the lease, rights, TRRs, or that use of allocated telecommunication resource may begin, and record a transaction in a transaction database identifying the telecommunication resource as being allocated for use by the second communication network.

In operation 242, the TCE component 122 may generate and send a lease/bid execution request message to the DSA arbitrage entity component 120 to initiate the execution of the lease (i.e., to begin using leased telecommunication resources, etc.). In operation 244, the DSA arbitrage entity component 120 may send a lease, bid grid, and TRR-related information (e.g., Lease ID, Property Owner ID, correlation information, status information, and information indicating whether the TRR, bid, or resource is active, to be activated, allocated, etc.) to the wireless telecom database component 112, which may receive and use the information to update the repository.

In operation 246, the DSA arbitrage entity component 120 may send the lease/bid execution request and the TRR-related information to the DPC component 126, which may receive and forward the information (e.g., lease/bid execution request) to the DSA lessee component 202 and the DSA lessor component 124 in operations 248 and 250. In operation block 252, any or all of the DSA lessee component 202, DPC component 126, TCE component 122, DSA arbitrage entity component 120, and/or DSA lessor component 124 may perform various operations to establish or enforce a lease or allocate resources. For example, the DPC component 126 may establish a first communication link to a first DSC 128a in a first communication network, establish a second communication link to a second DSC 128b in a second communication network, determine whether radio frequency (RF) spectrum resources are available for allocation within the second communication network, determine the amount of RF spectrum resources that are available for allocation, allocate all or a portion of the available RF resources of the second communication network for access and use by wireless devices 102 in the first communication network, send a communication message to the first DSC 128a (e.g., using a DSAAP protocol) to inform the first communication network that the use of the allocated RF spectrum resources may begin, record a transaction in a transaction database identifying an amount of RF spectrum resources allocated for use by the first communication network.

The DPC component 126 may receive a communication message that includes information indicating that the leased/allocated resources have been consumed and/or which requests that the allocated resources be released. In response, the DPC component may perform various operations to cause the first network to terminate its use of the allocated resources, and send a lease end message or resource consumed/release message to the DSA arbitrage entity component 120 in operation 254.

In operation 256, the DSA arbitrage entity component 120 may generate and send a communication message that includes the TRR-related information and lease information (e.g., lease ID, property owner ID, information indicating that the lease has ended, etc.) to the wireless telecom database component 112, which may receive and use this information to update its repository. In operation 258, the DSA arbitrage entity component 120 may generate and send a lease contract fulfilled message to the TCE component 122, which may receive and use the information to update its records.

In operation 260, the wireless telecom database component 112 may generate and send a communication message that includes TRR-related information (e.g., property owner ID, property owner credentials, lease credentials, etc.) to the DSA arbitrage entity component 120. In operation 262, the DSA arbitrage entity component 120 may generate and send a communication message that includes TRR-related information (e.g., the property owner ID, credential information, lease information) to the social economic payment component 116. In operation block 264, the social economic payment component 116 may use the received TRR-related information to calculate payment information, such as a lease percentage payment value. Also in operation block 264, the social economic payment component 116 may determine how much the property owner (or TRR owner) is the be paid for the use of the telecommunication resource by the first or second networks, generate invoices and payment instructions relating to the use of allocated resources, and perform other similar operations. In operation 266, the social economic payment component 116 may send the generated information (e.g., invoices, payment instructions, etc.) to the banking/charging component 114, which may receive and use this information to update its financial databases or account information. In operation 268, the banking/charging component 114 may generate and send a communication message to the property owner device 102 to inform it of a fracking payment (e.g., that the financial database/account have been updated, the owner has been paid for the use of the telecommunication resource, etc.).

Many existing property laws generally do not allow for someone who is not the owner of the property to gain access or utilize the property for pleasure or profit without permission being granted by the landowner. In cases of access being needed, rights of way are allowed again with the permission of the landowner.

Mineral rights are an example of how property rights are used when natural resources are involved and the resources are being extracted for profitable use. Mineral rights are typically separated into both surface and subsurface rights. Depending on how the sovereign state allocated mineral rights to property owners the property owner may or may not have specific rights to the minerals for their property that extend from the center of the earth to the heavens The specific mineral or natural resources that are associated with the land can involve both subsurface and surface rights. Within those subsurface and surface rights there is the ability to delineate different types of resources with which access is granted from which those resources can be extracted for use.

Mineral rights and leases are also bought and sold based on the type of natural resources that is being mined or used as is the ability to grant access or right of way for allowing access to obtain that resource.

New found resources have lead to financial speculation about revenue streams achievable from subsurface and surface rights associated with those resources enabling several types of mineral rights to be bought, sold and leased for the same property depending on the natural resource involved.

Because mineral rights enables the right to extract and profit from whatever is under the ground or on the surface of that ground are more and more commonly being separated from land deeds, and in many cases leading to land that is sold with and without various mineral rights.

Telecom resource rights follow a similar concept as that done with mineral rights. Specifically telecom resource rights is where the rights to deliver telecom services where the telecom resource rights and leases are bought sold and traded.

In an example a shopping mall owns the ground that the mall is located on. Tenants obtain leases to sell goods and provide services. Those tenants are afforded the opportunity to sell their goods and services by paying a lease to the landlord for their use of the ground space in the mall. With telecom resource rights the telecom rights for the particular property is now a new found natural resource from which additional revenue is now achievable for the owner of the telecom resource rights. The use of the telecom resource rights will enable the owner of the telecom rights to sell or lease the rights for delivering telecommunication services to a specific parcel or sub parcel of land.

It is argued that the telecom resource rights involves the use of a natural resource that is owned by the person or organization that has the telecommunications mineral rights for the parcel of land.

It is anticipated that telecom resource rights will be traded in a manner that facilities the natural resource being consumed or right of way being granted for the consumption of the telecommunication services.

Figure 3:
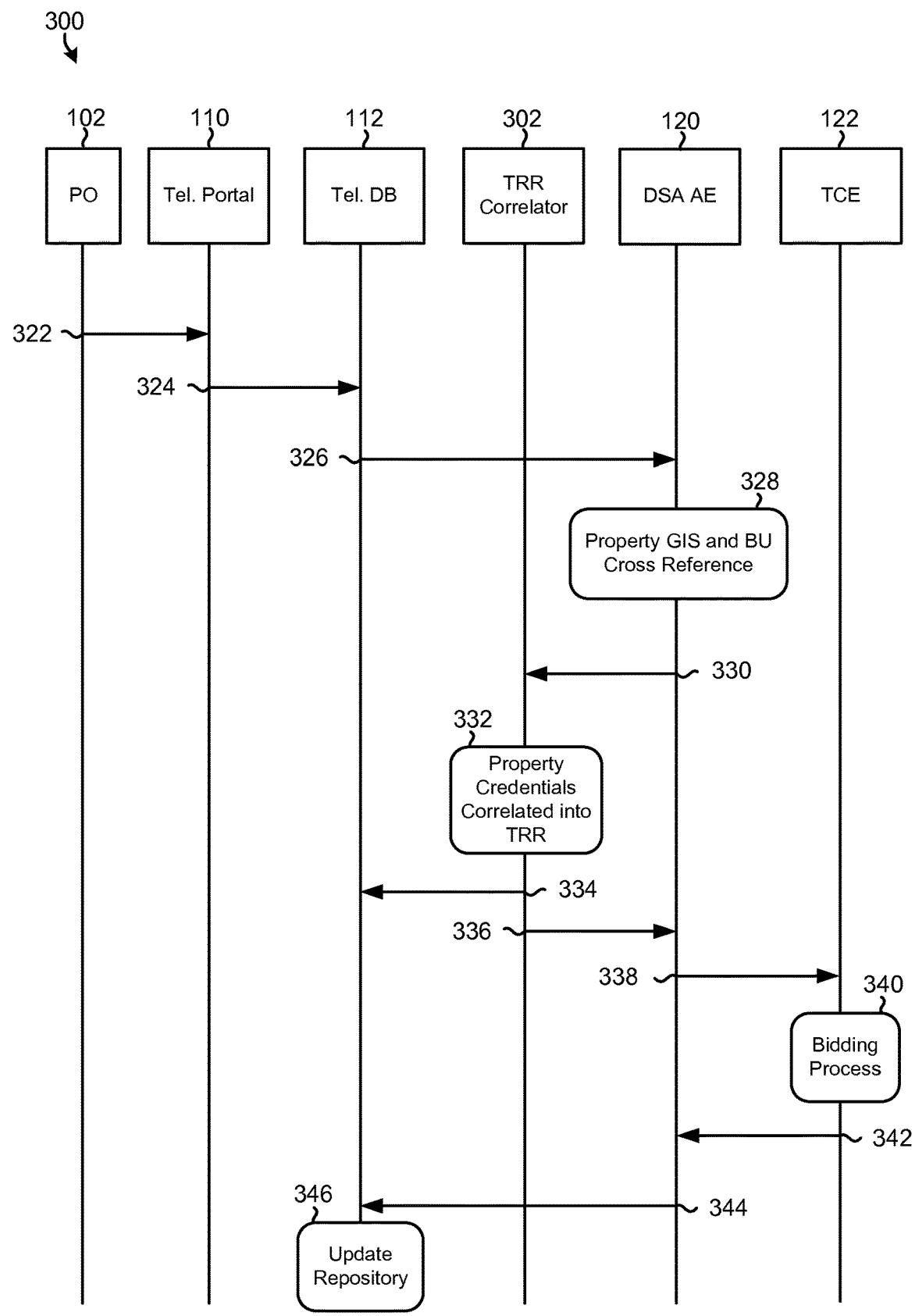

FIG. 3 illustrates information flows and communications between various components in an embodiment system 300 configured to allow entities to buy, sell, trade and lease telecom resource rights. In the example illustrated in FIG. 3, the system 300 includes a property owner device 102, a telecom fracking web/portal component 110, a wireless telecom database component 112, a TRR correlator component 302, a DSA arbitrage entity component 120, and a TCE component 122.

In operation 322, the property owner device 102 may receive, generate, and/or send TRR-related information that identifies a property owner registered property to the telecom fracking web/portal component 110. In operation 324, the telecom fracking web/portal component 110 may receive and use the TRR-related information to authenticate and verify the property owner, determine/retrieve property owner credentials, and send the TRR-related information and/or property owner credentials to the wireless telecom database component 112. In operation 326, the wireless telecom database component 112 may receive and use this information to determine whether the property/parcel identified in the TRR-related information is registered with the system (e.g., included in the repository, identifies a valid property or right, etc.), whether the property/parcel may be registered with the system, register the property/parcel, and send the updated TRR-related information and/or property registration information to the DSA arbitrage entity component 120. In operation block 328, the DSA arbitrage entity component 120 may receive use this to perform property GIS and BU cross reference operations.

In operation 330, the DSA arbitrage entity component may update the TRR-related information to include the results of its operations, as well as property and GIS credential information, and send the updated TRR-related information to a TRR correlator component 302. In operation block 332, the TRR correlator component 302 may correlate property credentials (and other credential information) with a TRR (e.g., an information structure that includes data field for storing information identifying the parcel, an owner of the parcel, property rights, telecomm resource usage rights, etc.). In addition, in operation block 332, the TRR correlator component 302 may identify and select a relevant TRR information unit/structure and update its information fields with the TRR-related information received from the DSA arbitrage entity. In operation 334, the TRR correlator component 302 may update and the TRR-related information (property owner ID, correlation information, etc.) to the wireless telecom database component 112, which may receive and use the information to update its repository (i.e., property/parcel repository). In some embodiments, the wireless telecom database component 112 may use the TRR-related information to identify, select, update, or create a TRR.

In operation 336, the TRR correlator component 302 may send the TRR-related information (e.g., TRR credential information) to the DSA arbitrage entity component 120. In operation 338, the DSA arbitrage entity component 120 may forward the TRR-related information to the TCE component 122. In operation block 340, the TCE component 122 may receive and use the TRR-related information to perform telecommunication commodity exchange operations (e.g., conducting a resource auction, receiving bids for resources, identifying a winner, etc.). In operation 342, the TCE component 122 may identify a property or TRR owner as a bid winner, and send information identifying the bid winner to the DSA arbitrage entity component 120. In operation 344, the DSA arbitrage entity component 120 may update the TRR-related information (e.g., credential information), and send the update information to the wireless telecom database component 112. In operation block 346, the wireless telecom database component 112 may update its repository and/or one or more TRRs with the updated information received from the DSA arbitrage entity component 120.

Figure 4:
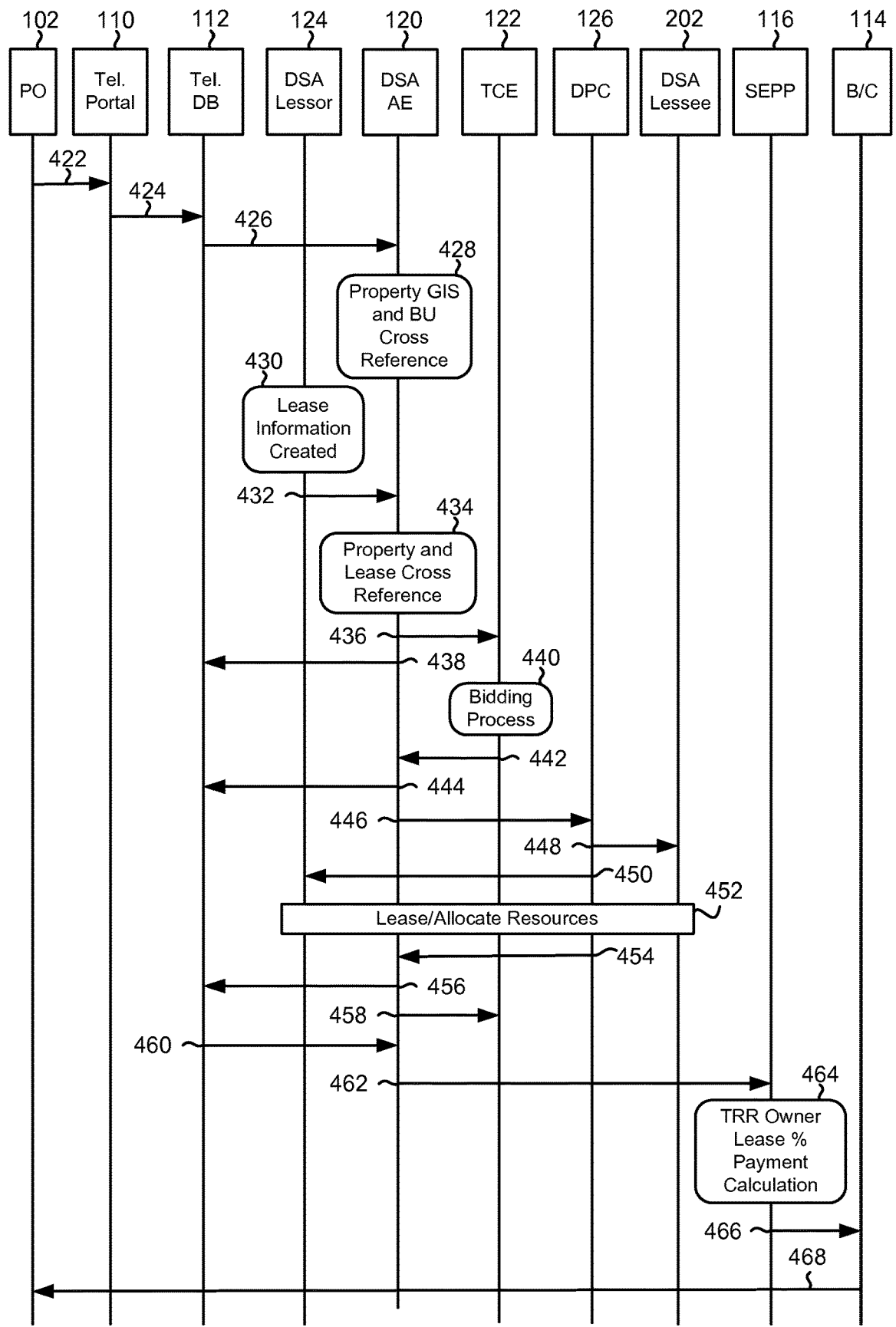

FIG. 4 illustrates information flows and communications between various components in an embodiment system 400 configured to incorporate telecom resource rights into a DSA process, enabling the owner of the telecom resource rights or group of telecom resource rights to benefit from the delivery of wireless services on a particular parcel of land or multiple parcels of land. In the example illustrated in FIG. 4, the system 400 includes a property owner device 102, a telecom fracking web/portal component 110, a wireless telecom database component 112, a DSA lessor component 124, a DSA arbitrage entity component 120, a TCE component 122, a DPC component 126, a DSA lessee component 202 (which may include, or included in, a DSC component 128), a social economic payment component 116, and a banking/charging component 114.

In operation 422, the property owner device 102 may send TRR-related information that identifies a property owner registered property or a property associated with a TRR to the telecom fracking web/portal component 110. In operation 424, the telecom fracking web/portal component 110 may authenticate and verify the property owner or TRR owner, determine/retrieve property/TRR owner credentials, update the TRR-related information (e.g., with property owner credentials), and send the updated TRR-related information to the wireless telecom database component 112. In operation 426, the wireless telecom database component 112 may use the received TRR-related information to determine whether a property/parcel is registered with the system, update the TRR-related information (e.g., with property registration information), and send the updated TRR-related information to the DSA arbitrage entity component 120. In operation block 428, the DSA arbitrage entity component 120 may use the received TRR-related information to cross correlate registered parcels of land (or TRRs, BUs, etc.) to one or more resource/bid grids, and update a TRR or the TRR-related information (e.g., with correlation information, property information, owner information, location/bid area information, etc.). In addition, the DSA arbitrage entity component 120 may perform other similar operations, such as property GIS operations or BU cross reference operations, in operation block 428.

In operation block 430, the DSA lessor component 124 may create lease information, which may include lease credentials. In operation 432, the DSA lessor component 124 may send the lease information to the DSA arbitrage entity component 120. In operation block 434, the DSA arbitrage entity component 120 may receive and use the lease information to determine, analyze and/or cross reference the TRR (or the property identified in the TRR-related information) with the lease information. In operation 436, the DSA arbitrage entity component 120 may update the TRR-related information (e.g., results of the cross referencing operations, the lease credentials, lease ID, TRR ID, and other similar data, etc.), and send all or portions of the updated TRR-related information to the TCE component 122. In addition, in operation 438, the DSA arbitrage entity component 120 may send all or portions of the updated TRR-related information (e.g., lease ID, TRR ID, etc.) to the wireless telecom database component 11 for storage (e.g., in the parcel repository, etc.).

In operation block 440, the TCE component 122 may use the TRR-related information to conduct a telecommunications commodity exchange or resource auction, which may include performing a bidding method/process or other DSA operations. In operation 442, the TCE component 122 may generate and send a lease/bid execution request message to the DSA arbitrage entity component 120. In operation 444, the DSA arbitrage entity component 120 may update the TRR-related information (e.g., with lease ID, TRR ID, correlation information, status information, information indicating whether the TRR, bid, or resource is active, to be activated, allocated, etc.), generate a communication message that includes information pertaining to a lease, bid grid, TRR, etc., and send the communication message to the wireless telecom database component 112 for updating of the repository.

In operation 446, the DSA arbitrage entity component 120 may send TRR-related information and the lease/bid execution request to the DPC component 126, which may process and send the received information to the DSA lessee component 202 and the DSA lessor component 124 in operations 448 and 450. In operation block 452, any or all of the DSA lessee component 202, DPC component 126, TCE component 122, DSA arbitrage entity component 120, and/or DSA lessor component 124 may perform various operations to establish or enforce a lease or allocate resources. As part of these operations, the DPC component 126 and DSC components 128 the lessee and lessor networks may perform various DSA operations (discussed above with reference to FIG. 2). In operation 454, the DPC component 126 may receive a communication message that includes information indicating that the leased/allocated resources have been consumed and/or requests that the allocated resources be released. In response, the DPC component may perform various operations to cause the first network to terminate its use of the allocated resources, and send a lease end message or resource consumed/release message to the DSA arbitrage entity component 120 in operation 454.

In operation 456, the DSA arbitrage entity component 120 may generate and send a communication message that includes the lease information (e.g., lease ID, etc.), TDD ID, and information that indicates that the lease has ended to the wireless telecom database component 112, which may receive and use this information to update its repository. In operation 458, the DSA arbitrage entity component 120 may generate and send a lease contract fulfilled message to the TCE component 122, which may receive and use the information to update its records.

In operation 460, the wireless telecom database component 112 may generate and send a communication message that includes TRR-related information (e.g., TRR ID, TRR credentials, lease credentials, etc.) to the DSA arbitrage entity component 120. In operation 462, the DSA arbitrage entity component 120 may generate and send a communication message that includes TRR-related information (e.g., the TRR ID, credential information, lease information) to the social economic payment component 116.

In operation block 464, the social economic payment component 116 may use the TRR-related information to calculate payment information, such as a lease percentage payment value, to determine how much the TRR owner is to be paid for the use of the telecommunication resource by the first or second networks. The social economic payment component 116 may also generate invoices and payment instructions relating to the use of allocated resources in operation block 464. In operation 466, the social economic payment component 116 may send the generated information (e.g., invoices, payment instructions, etc.) to the banking/charging component 114, which may receive and use this information to update a financial database or account information. In operation 468, the banking/charging component 114 may generate and send a communication message to the device 102 to inform it of a fracking payment (e.g., that the financial database/account have been updated, etc.).

A telecom resource right may be defined based on the parcel of land and the type of telecommunications services allowed for that particular parcel of land, similar to that afforded mineral rights where the particular mineral is defined allowing for multiple mineral rights to be sold, leased and traded for the same parcel or sub parcel of land.

With telecom resource rights with owner of the telecommunication rights has the ability participate in the delivery and executing of the telecom resources being leased which are associated with their property or telecom resource rights.

Another example involves farms where the mineral rights for obtaining natural gas are sold to a gas developer while the other minerals are not. However with telecom resource rights the rights could be sold a telecommunication operator for specific frequency bands say 1900-2000 MHz while the remaining frequency bands or spectrum are still associated with the deed for the property.

A telecom resource rights can be defined in many ways. However one example could be that the telecom resource rights is associated with the particular parcel of land and conveys specific rights as for use of various radio frequency devices or services on the parcel or sub parcel itself. The telecom resource rights for that particular resource allocation can then be bought, sold or traded where it is no longer part of the parcels deed itself.

Table 1 below illustrates example information fields and values stored in a TRR.

TABLE 1 telecom resource rights Attributes

| TRR | |
|---|---|
| Lot and Parcel | Geoboundary or lot and plot definition |
| Telecommunication Type | Wireless Fixed, Wireless Mobility, Cable, Satellite, Wired Internet, DSL, Broadcast Television Microwave Backhaul, |
| Telecommunication Type | Wireless Fixed, Wireless Mobility, Cable, Satellite, Wired Internet, DSL, Broadcast Television Microwave Backhaul, |
| Access Type | Right of Way./Use |
| Wireless Frequency Band | 0-100 MHz |
| | 100-400 MHz |
| | 400-800 MHz |
| | 800-1000 MHz |
| | 1000-2500 MHz |

TABLE 1-continued telecom resource rights Attributes

| TRR | |
|---|---|
| | 2500-6000 MHz |
| | 6000-10000 MHz |
| | 10000-15000 MHz |
| | 15000-25000 MHz |
| | 25000-35000 MHz |
| | 35000-45000 MHz |
| | 45000-100000 MHz |

Figure 5:
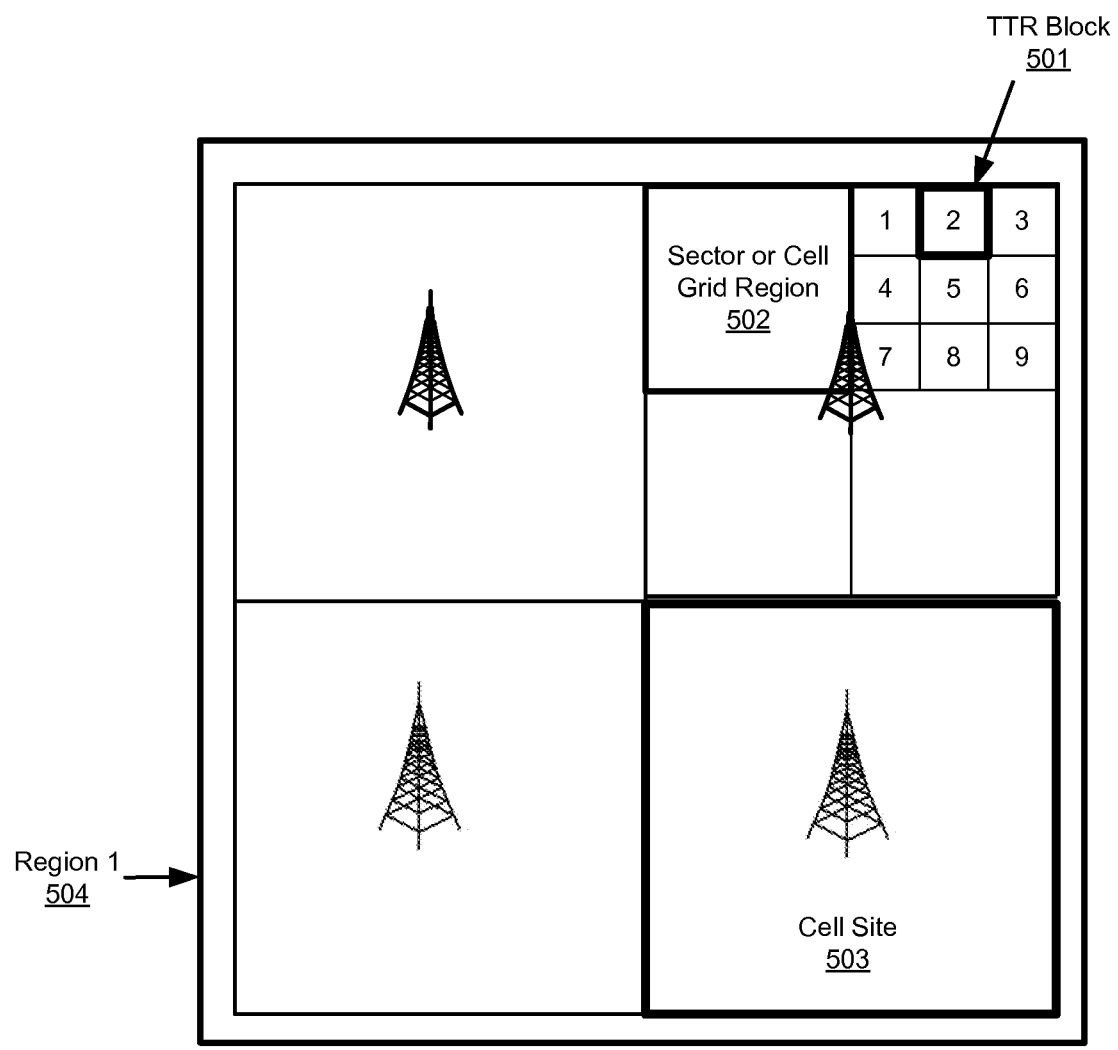
FIG. 5 is a schematic diagram of a cellular communication system illustrating implementation of the various embodiments.

The resources made available can involve multiple telecommunication service types. For example, FIG. 5 illustrates that resources could be within a single TRR block 501 or involve multiple TRR blocks or sub parcels that cover a sector/cell grid region 502, cell site 502, or region 504.

A TRR block 501 may be the most granular geospatial area of commoditized telecommunication resource (e.g., broadband resource). Each TRR block 501 may include an X amount of telecommunication resources (e.g., bandwidth) depending on its characteristics and information values. The TRR blocks 501 may be aggregated into larger cubes or forms within polygons or groups of polygons, such as to cover a sector/cell grid region 502, cell site 503, or region 504.

Figure 6A:
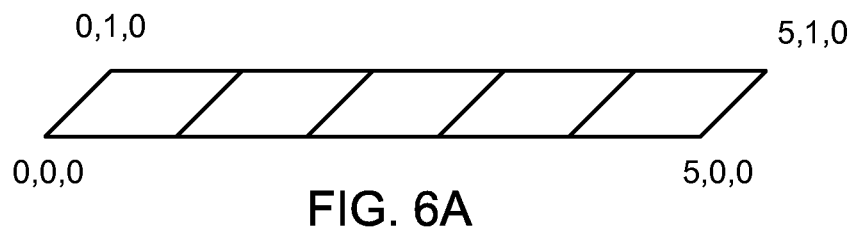
FIGS. 6-10 are diagrams illustrating fracking of space for managing telecommunication rights that may be used to implement the various embodiments.
Figure 6B:
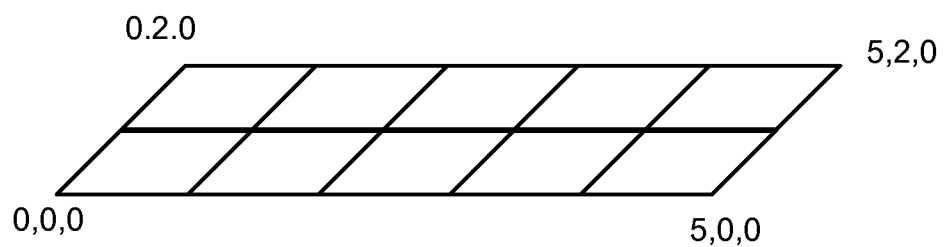
Figure 6C:
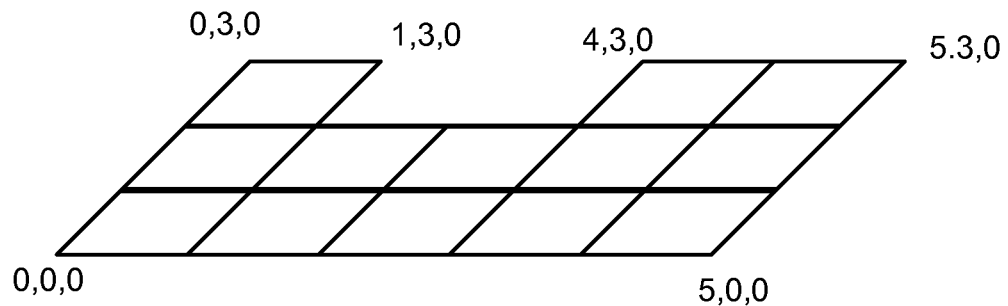

As mentioned above, a parcel of land or some other geodetic grouping can consist of, or be represented by, multiple TRR blocks. FIG. 6A shows an example of one possible combination of TRR blocks (a TRR block grouping). FIG. 6B is another example of a TRR block grouping. FIG. 6C illustrates that TRR blocks may be arranged to cover an irregular shape so as to better match a particular parcel of land associated with a telecom resource right.

Figure 7A:
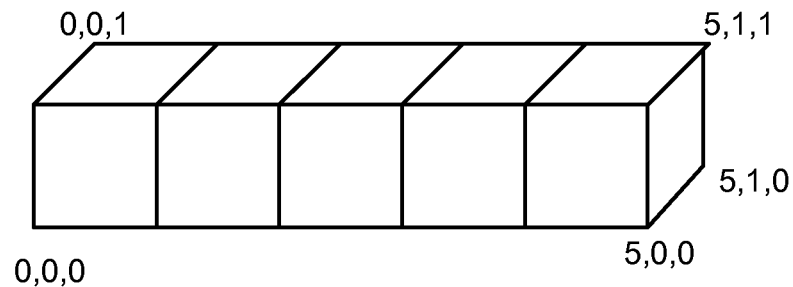
Figure 7B:
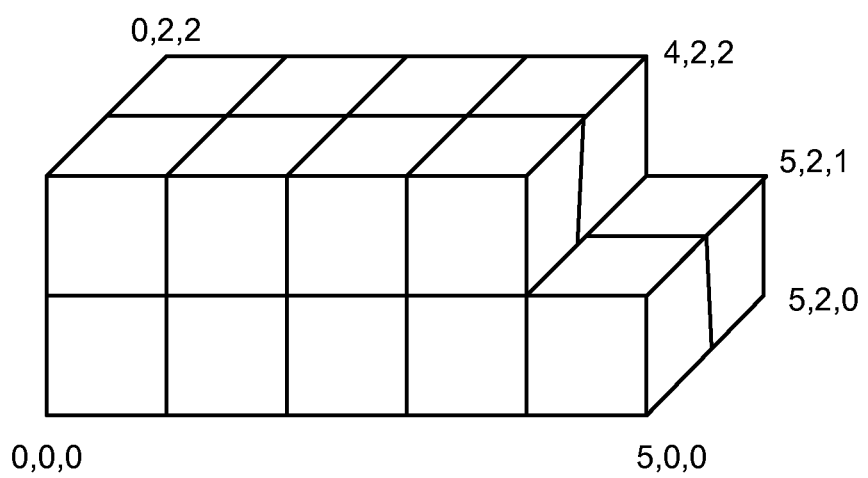

FIGS. 7A and 7B are similar in nature to FIGS. 6A-6C with the exception that there is a Z height or altitude component. The altitude component Z may be relative and represent an elevation above ground level (AGL), or may be measure against an absolute reference such as above mean sea level (AMSL). The may be expressed in any units, such as 100 meters AGL may be defined as the Z0 attribute.

Figure 8:
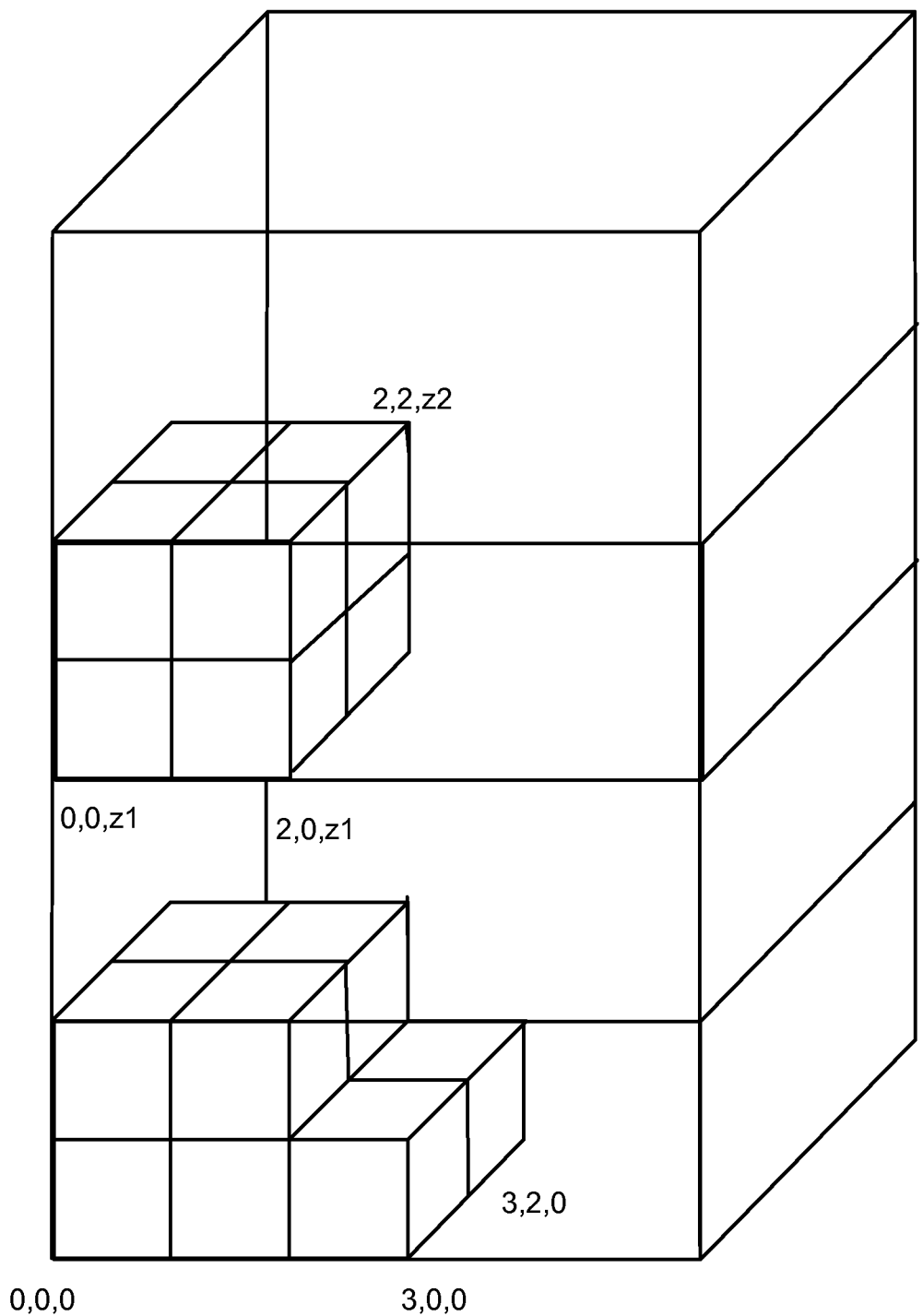

In FIG. 8, TRR blocks are illustrated within a building and within different floors within the building. As illustrated, the volume within the building may be designated into different telecom resource rights sub parcels.

The configuration and compliment for the TRR block groupings shown in FIG. 8 is but one example of how telecom resource rights could be used to cover different floors within a building or other structure defining different telecommunication rights based the parcel or sub parcel of land involved as well as the particular altitude involved.

The telecom resource rights for a sub parcel or parcel can also be associated with negative Z axis. The negative Z axis can involve areas of the parcel or sub parcel which include below grade parking facilities, or basements or anything else below the nominal ground terrain.

Figure 9:
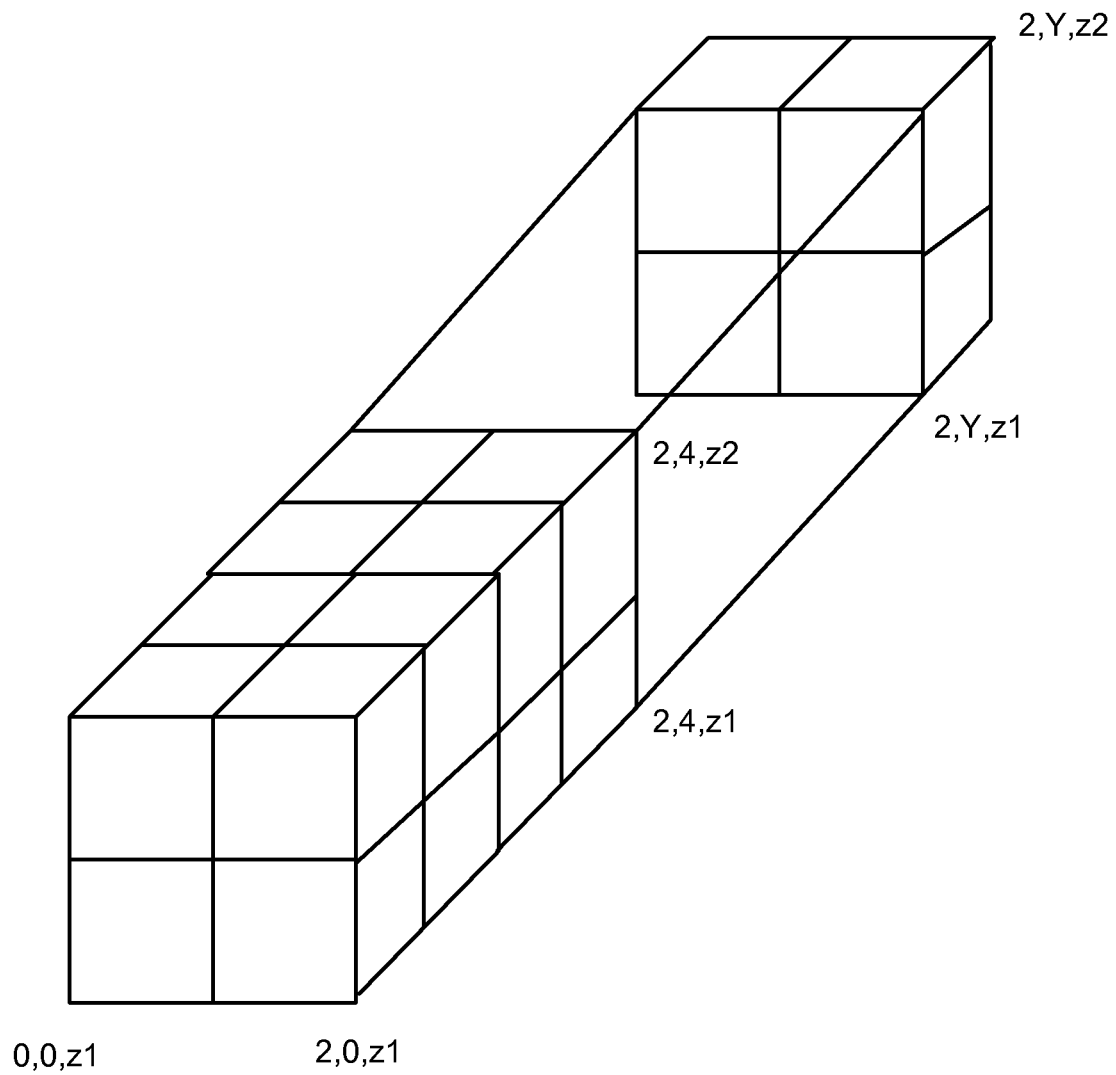
Figure 10:
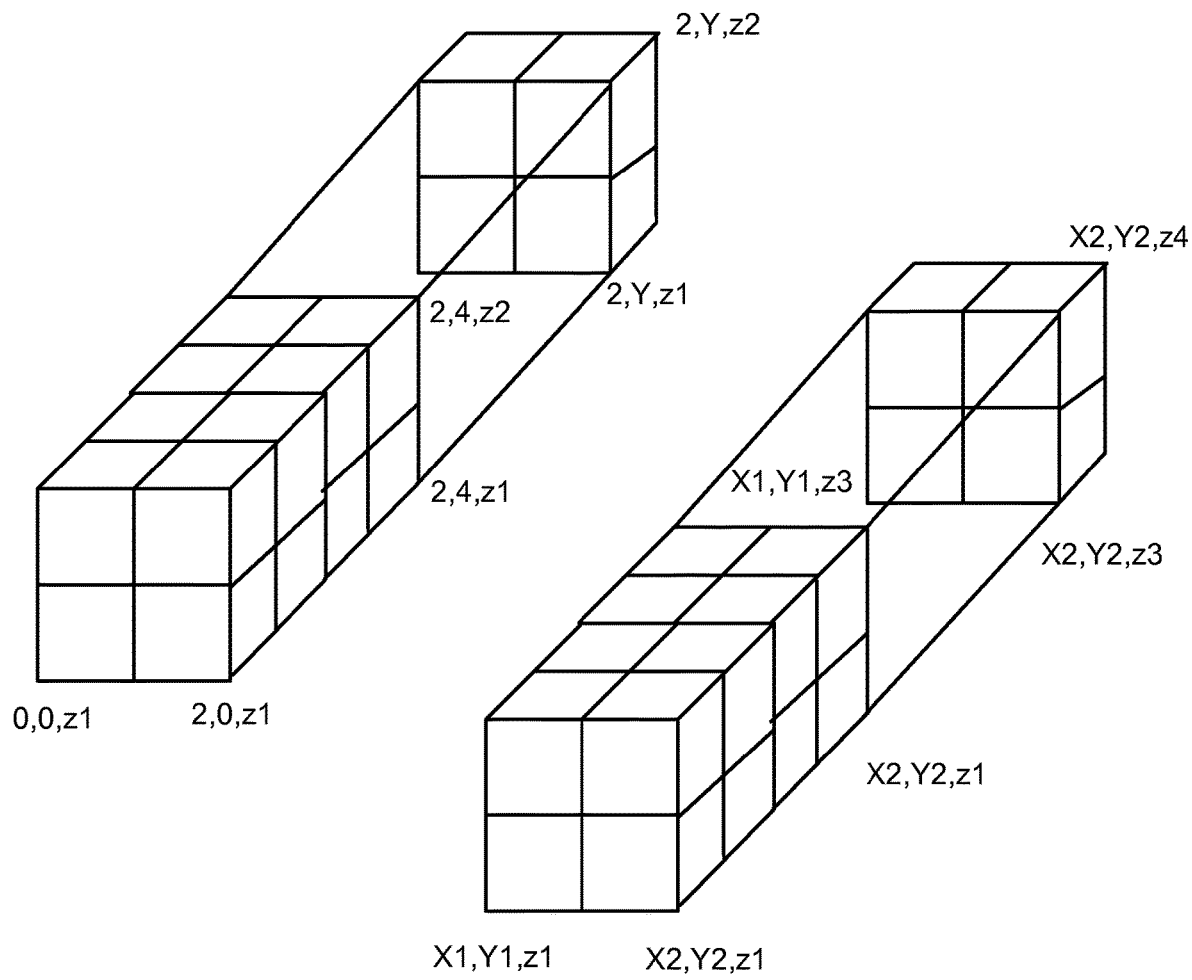

FIG. 9 illustrates a TRR block grouping for a specific right of way, such as for a microwave backhaul connection between two microwave dishes. FIG. 10 illustrates a TRR block grouping that covers corridors that are positioned adjacent and parallel to each other, defining specific swim lanes for the telecommunication resources. Such corridor grouping of the TRR blocks could be used to allocate telecommunication resources right of way to aircraft, whether manned or unmanned. The telecom resource rights corridor could also be defined with respect to microwave backhaul allocation.

Another example of a corridor cluster could involve mobility traffic involving wireless radio resources utilizing a town, city or county road. The telecom resource rights would enable the local government to grant the right of way for specific telecommunication resources that can be used on that particular road structure.

Municipalities can offer telecom resource rights to the highest bidder or bidders depending on how they define the telecom resource rights itself. This would also provide a unique revenue stream to the municipality for providing a right of way for telecommunication services for vehicles utilizing the roads that the municipality owns and or maintains.

Figure 11:
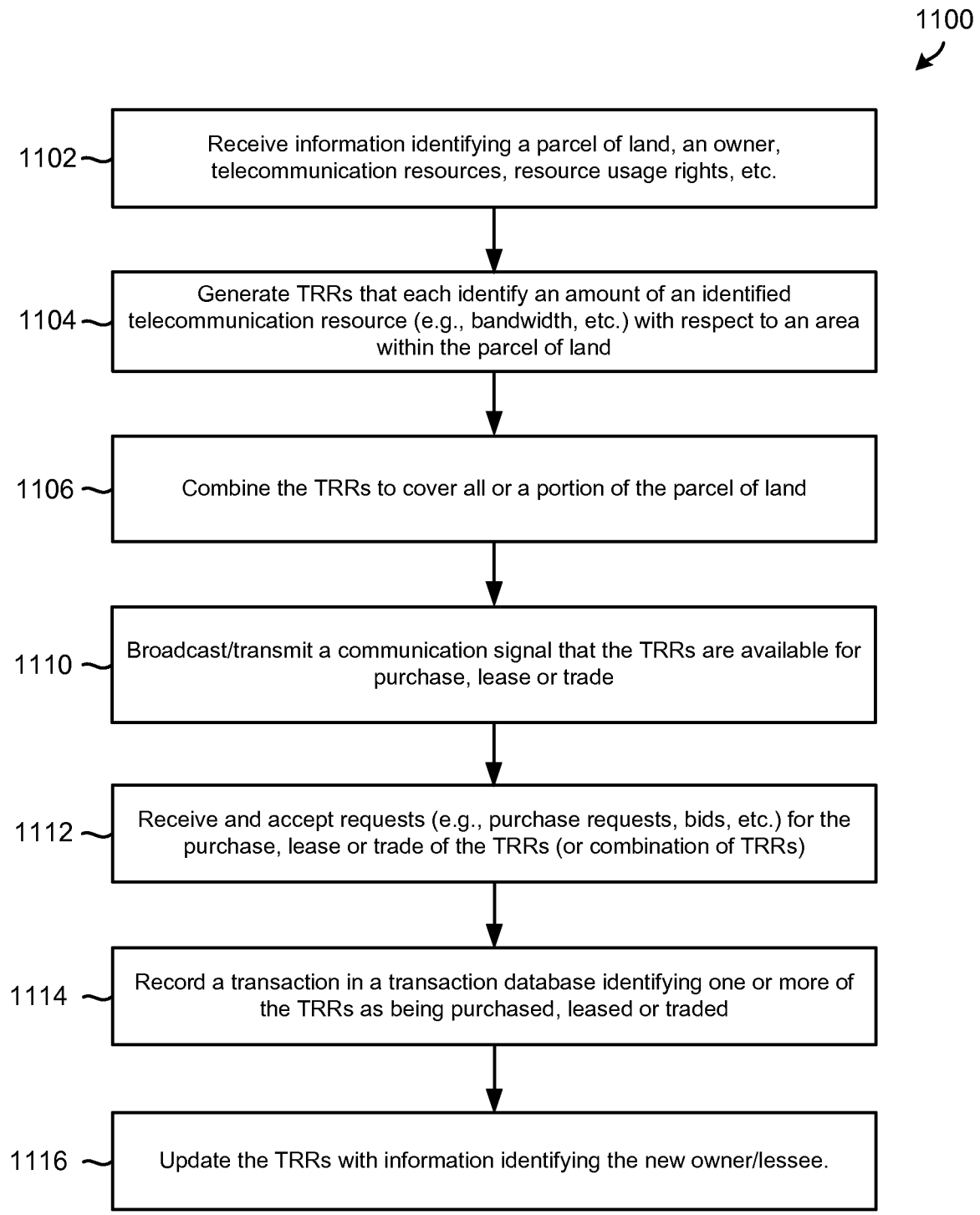
FIG. 11 is a process flow diagram illustrating a method of generating and using telecommunication resource right units in accordance with an embodiment.

FIG. 11 illustrates a method 1100 of generating and using TRRs in accordance with an embodiment. Method 1100 may be performed by one or more processors in a server computing device. In block 1102, a processor may receive information identifying a parcel of land, an owner, telecommunication resources, resource usage rights, etc. In block 1104, the processor may generate TRRs (information structures, etc.) that each identify an amount of an identified telecommunication resource (e.g., bandwidth, etc.) with respect to an area within the parcel of land. In optional block 1106, the processor may combine the TRRs to cover all or a portion of the parcel of land. In block 1110 the processor may broadcast/transmit a communication signal that indicates the TRRs (or TRR combinations) are available for purchase, lease or trade. In block 1112, the processor may receive and accept requests (e.g., purchase requests, bids, etc.) for the purchase, lease or trade of the TRRs (or combination of TRRs). In block 1114, the processor may record a transaction in a transaction database identifying one or more of the TRRs as being purchased, leased or traded. In block 1116, the processor may update the TRRs with information identifying the new owner/lessee.

Figure 12:
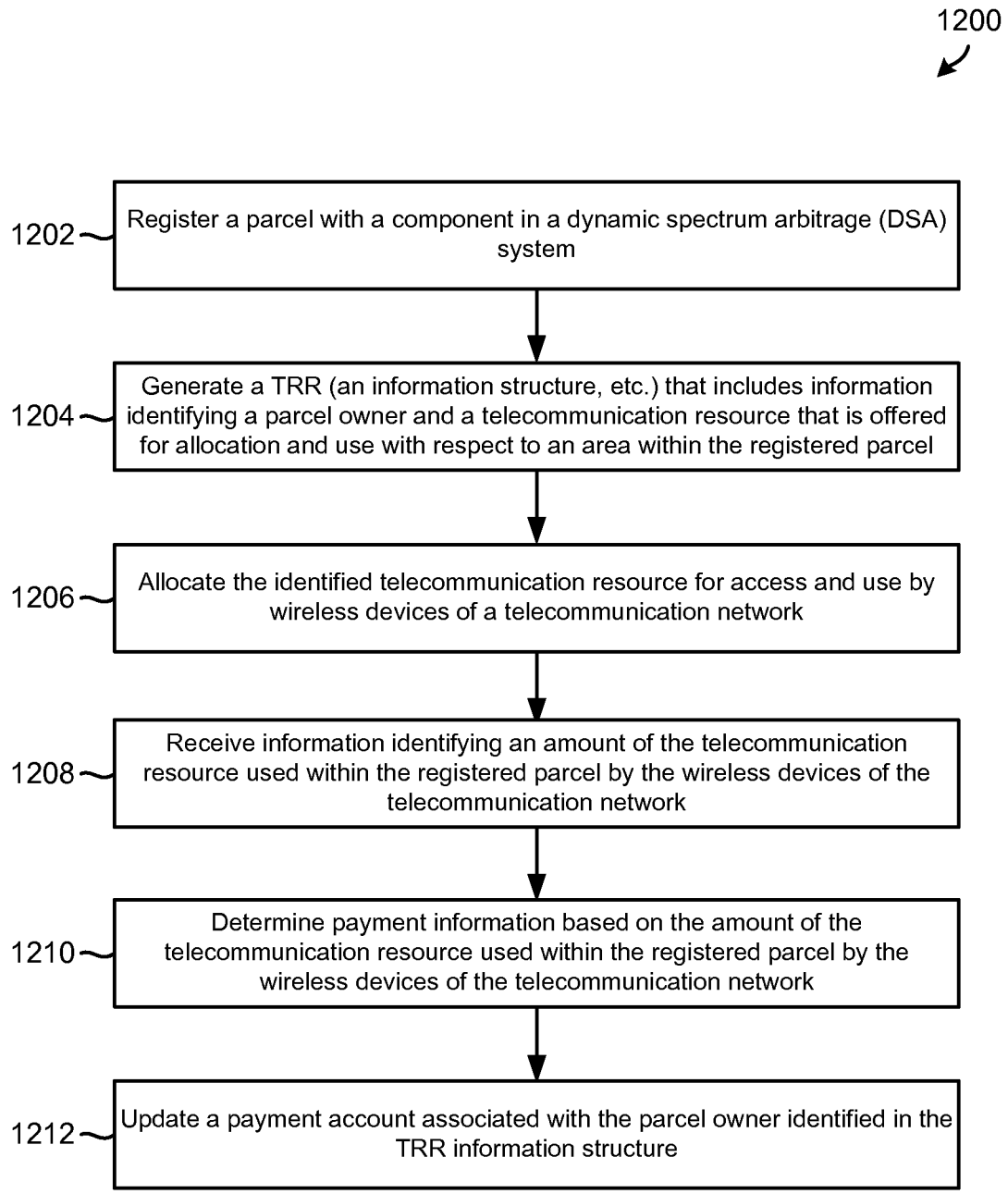
FIG. 12 is a process flow diagram illustrating a method of providing telecomm resource rights to property owners in accordance with an embodiment.

FIG. 12 illustrates a method 1200 of providing telecomm resource rights to property owners in accordance with an embodiment. Method 1200 may be performed by one or more processors in one or more server computing devices. In the example illustrated in FIG. 12, in block 1202, a processor may register a parcel with a component in a dynamic spectrum arbitrage (DSA) system. In block 1204, the processor may generate a TRR (an information structure, etc.) that includes information identifying a parcel owner and a telecommunication resource that is offered for allocation and use with respect to an area within the registered parcel. For example, the processor may generate a TRR information structure that identifies an amount of the telecommunication resource that is offered for allocation and use with respect to the entire parcel. The processor may also generate a plurality of TRR information structures that each include information identifying an amount of the telecommunication resource offered for allocation and use with respect to an geographic encompassing one cubic meter.

In block 1206, the processor may allocate the identified telecommunication resource (e.g., by communicating with a DSA component) for access and use by wireless devices of a telecommunication network. In block 1208, the processor may receive information identifying an amount of the telecommunication resource used within the registered parcel by the wireless devices of the telecommunication network. In block 1210, the processor may determine payment information based on the amount of the telecommunication resource used within the registered parcel by the wireless devices of the telecommunication network. In block 1212, the processor may update a payment account associated with the parcel owner identified in the TRR information structure.

In some embodiments, the processor may also use the generated TRR information structure to offer a telecomm resource right for the use of the identified telecommunication resource with respect to the registered parcel for purchase, lease, or trade on a commodities exchange.

In some embodiments, the processor may also be configured to perform telecommunications commodity exchange operations that include establishing a communication link to a component in a first communication network that includes the telecommunication resource identified in the TRR information structure, determining whether the telecommunication resource is available for allocation based on information received via the communication link, broadcasting a communication signal that includes information suitable for informing a plurality of communication networks that the telecommunication resource is available for allocation via an auction and including an auction start time for the auction, receiving bids from the plurality of communication networks for the telecommunication resource determined to be available for allocation in response to broadcasting the communication message and after the auction start time included in the broadcast communication signal, allocating the telecommunication resource of the first communication network for access and use by a second communication network in the plurality of communication networks based on accepted bids, sending a communication message to the second communication network, the communication message including information suitable for informing the second communication network that use of allocated telecommunication resource may begin, recording a transaction in a transaction database identifying the telecommunication resource as being allocated for use by the second communication network, and transmitting a communication message that includes information identifying locations and amounts of the telecommunication resource used by wireless devices in the second communication network.

In some embodiments, the processor may be configured to perform DSA operations that include establishing a first communication link to a first server in a first communication network, establishing a second communication link to a second server in a second communication network, receiving a request for telecommunication resources from the second server, determining an amount of telecommunication resources available for allocation within the first communication network, allocating a portion of the available telecommunication resources of the first communication network for access and use by multiple cell sites in the second communication network, informing the second server that use of allocated telecommunication resources may begin, and transmitting a communication message that includes information identifying locations and amounts of the telecommunication resource used by wireless devices in the second communication network.

In some embodiments, the processor may be configured to perform DSA operations that include establishing a first communication link to a first server in a first communication network, establishing a second communication link to a second server in a second communication network, receiving in the communications server a request for RF spectrum resources from the second server, sending query messages to the first server in the first communication network and at least one other server in another communication network based on a pre-defined criteria including a type, capability, and geographic criterion of a wireless device (in response to the communications server receiving the request for RF spectrum resources from the second server), receiving a message from the first server in response to sending the query messages (the received message identifying an amount of first communication network RF spectrum resources available for reallocation, etc.), pooling RF spectrum resources identified in the received message and RF spectrum resources of at least one other communication network, allocating the pooled resources for access and use by multiple cell sites in the second communication network, informing the second server that use of allocated RF spectrum resources may begin for the wireless device to establish a communication connection with the second communication network, and transmitting a communication message that includes information identifying a location and amount of RF spectrum resources used by the wireless device.

Figure 13:
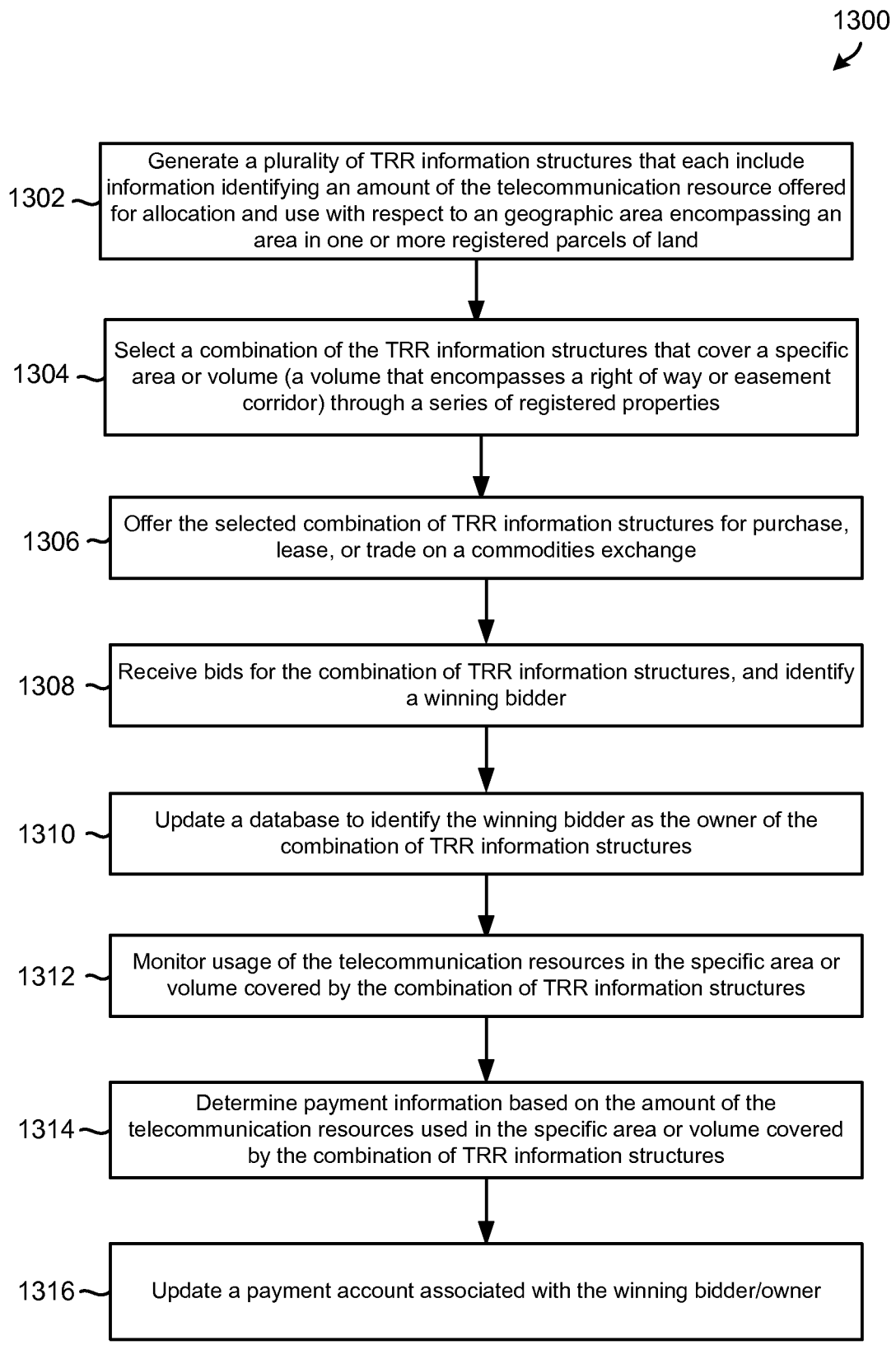
FIG. 13 is a process flow diagram illustrating a method of providing telecomm resource rights to property owners in accordance with another embodiment.

FIG. 13 illustrates a method 1300 of providing telecomm resource rights to property owners in accordance with an embodiment Method 1300 may be performed by one or more processors in one or more server computing devices. In block 1302, a processor may generate a plurality of TRR information structures that each include information identifying an amount of the telecommunication resource offered for allocation and use with respect to an geographic area encompassing an area in one or more registered parcels of land. In block 1304, the processor may select a combination of the TRR information structures that cover a specific area or volume (a volume that encompasses a right of way or easement corridor) through a series of registered properties. In block 1306, the processor may offer the selected combination of TRR information structures for purchase, lease, or trade on a commodities exchange. In block 1308, the processor may receive bids for the combination of TRR information structures, and identify a winning bidder. In block 1310, the processor may update a database to identify the winning bidder as the owner of the combination of TRR information structures.

In block 1312, the processor may monitor usage of the telecommunication resources in the specific area or volume covered by the combination of TRR information structures. For example, the processor may poll a communication port for messages that include information identifying the amounts and locations in which the resources were used. In block 1314, the processor may determine payment information based on the amount of the telecommunication resources used in the specific area or volume covered by the combination of TRR information structures. In block 1316, the processor may update a payment account associated with the winning bidder/owner.

Further embodiments may include a server computing device having a multi-core processor that includes two or more processor cores, one or more of which is configured with processor-executable instructions to perform operations of the DSA methods described in this application. Further embodiments may include a server computing device having various means for performing functions of the operations of the DSA methods described in this application. Further embodiments may include non-transitory processor-readable storage medium having stored thereon processor-executable instructions to cause a processor to perform operations of the DSA methods described in this application.

Figure 14:
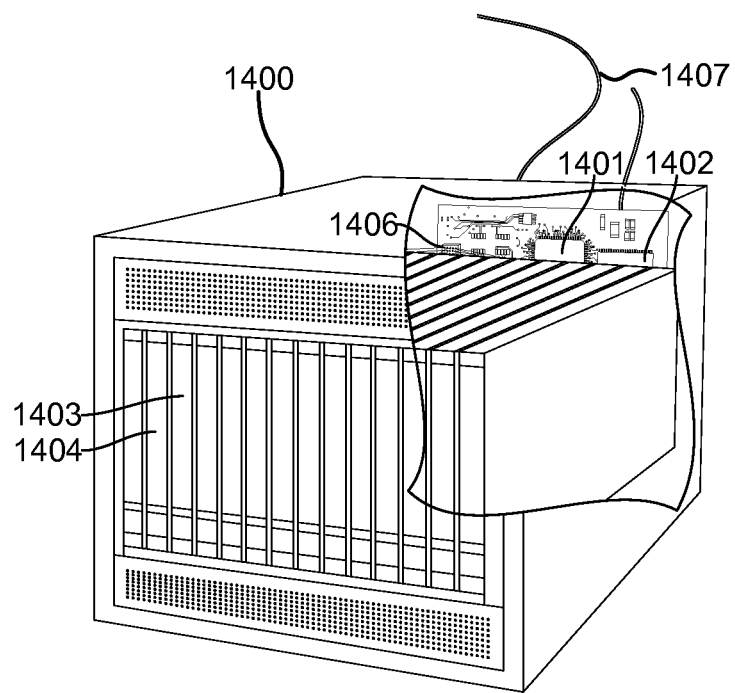
FIG. 14 is a component block diagram of a server suitable for implementing or use with various embodiments.

The embodiments described above, including the DSA and spectrum arbitrage functions, may be implemented on any of a variety of commercially available server devices, such as the server 1400 illustrated in FIG. 14. Such a server 1400 typically includes a processor 1401 coupled to volatile memory 1402 and a large capacity nonvolatile memory, such as a disk drive 1403. The server 1400 may also include a floppy disc drive, compact disc (CD) or DVD disc drive 1404 coupled to the processor 1401. The server 1400 may also include network access ports 1406 coupled to the processor 1401 for establishing data connections with a network 1407, such as a local area network coupled to other communication system computers and servers.

As used in this application, the terms "wireless device," "mobile device" and "user equipment (UE)" may be used interchangeably to refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless device may include a programmable processor and memory.

As used in this application, the terms "component," "module," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, a computer, a server, network hardware, etc. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon.

A number of different cellular and mobile communication services and standards are available or contemplated in the future, all of which may implement and benefit from the various embodiments disclosed in this application. Such services and standards include, e.g., third generation partnership project (3GPP), long term evolution (LTE) systems, third generation wireless mobile communication technology (3G), fourth generation wireless mobile communication technology (4G), global system for mobile communications (GSM), universal mobile telecommunications system (UMTS), 3GSM, general packet radio service (GPRS), code division multiple access (CDMA) systems (e.g., cdmaOne, CDMA2000™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WIMAX), wireless local area network (WLAN), public switched telephone network (PSTN), Wi-Fi Protected Access I & II (WPA, WPA2), Bluetooth®, integrated digital enhanced network (iden), land mobile radio (LMR), and evolved universal terrestrial radio access network (E-UTRAN). Each of these technologies involves, for example, the transmission and reception of voice, data, signaling and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method of providing telecomm resource rights to property owners, comprising:

registering, via a processor of a server computing device, at least one parcel with at least a wireless telecom database in a dynamic spectrum arbitrage (DSA) system, wherein the DSA system includes components configured to establish a first communication link between a communications server and a first server in a first communication network, establish a second communication link between the communications server and a second server in a second communication network, and inform the second server whether use of allocated telecommunication resources may begin;

generating, via the processor of the server computing device, a plurality of telecom resource right (TRR) information structures that each include information identifying a registered parcel, a parcel owner, and an amount of a telecommunication resource of the first communication network that is offered for allocation and use by wireless devices of the second communication network with respect to a geographic area encompassing one cubic meter within the registered parcel;

combining, via the processor of the server computing device, the TRR information structures to encompass a geographic area larger than one cubic meter;

sending a message to the communications server that causes the processor of the communications server to allocate the telecommunication resources identified in the combined TRR information structures from the first communication network for access and use by the wireless devices of the second telecommunication network;

receiving, via the processor of the server computing device, information identifying the amounts of the telecommunication resources used by the wireless devices of the second telecommunication network within each cubic meter of the geographic area encompassed by the combined TRR information structures; and updating, via the processor of the server computing device, a payment account associated with at least one parcel owner identified in the combined TRR information structures based on the amounts of the telecommunication resources used by the wireless devices of the second telecommunication network within each cubic meter of the geographic area encompassed by the combined TRR information structures.

2. The method of claim 1, wherein:
combining the TRR information structures to encompass a geographic area larger than one cubic meter comprises combining the TRR information structures to cover a volume that encompasses a right of way or easement corridor through a series of registered parcels; and
the method further includes offering the combined TRR information structures for purchase, lease, or trade on a telecommunications commodities exchange via the communications server.

3. The method of claim 2, wherein offering the combined TRR information structures for purchase, lease, or trade on the telecommunications commodities exchange via the communications server comprises:
determining in the communications server whether the identified telecommunication resource is available for allocation based on information received via the communication link;
broadcasting a communication signal that includes information for informing a plurality of other communication networks that the identified telecommunication resource is available for allocation via an auction and including an auction start time for the auction;
receiving bids from the plurality of communication networks for the identified telecommunication resource determined to be available for allocation in response to broadcasting the communication signal and after the auction start time included in the broadcast communication signal;
allocating the identified telecommunication resource of the first communication network for access and use by the second communication network in the plurality of communication networks based on accepted bids;
sending a communication message to the second communication network, the communication message including information for informing the second communication network that use of the allocated telecommunication resource may begin;
recording a transaction in a transaction database identifying the identified telecommunication resource as being allocated for use by the second communication network; and
transmitting another communication message that includes information identifying locations and amounts of the identified telecommunication resource used by the wireless devices in the second communication network.

4. The method of claim 1, wherein sending the message to the communications server that causes the processor of the communications server to allocate the telecommunication resources identified in the combined TRR information structures from the first communication network for access and use by the wireless devices of the second telecommunication network further comprises:
receiving in the communications server a request for telecommunication resources from the second server;
determining in the communications server an amount of telecommunication resources available for allocation within the first communication network;
allocating a portion of the available telecommunication resources of the first communication network for access and use by multiple cell sites in the second communication network;
informing the second server that use of allocated telecommunication resources may begin; and
transmitting a communication message that includes information identifying locations and amounts of the telecommunication resource used by the wireless devices in the second communication network.

5. The method of claim 1, wherein sending the message to the communications server that causes the processor of the communications server to allocate the telecommunication resources identified in the combined TRR information structures from the first communication network for access and use by the wireless devices of the second telecommunication network further comprises:
receiving in the communications server a request for RF spectrum resources from the second server;
sending a query message from the communications server to the first server in the first communication network and at least one other server in another communication network based on a pre-defined criteria including a type, capability, and geographic criterion of the wireless device in response to the communications server receiving the request for RF spectrum resources from the second server;
receiving a message in the communications server from the first server in response to sending the query message, the received message identifying an amount of first communication network RF spectrum resources available for reallocation;
pooling the first communication network RF spectrum resources identified in the received message and RF spectrum resources of at least one other communication network;
allocating by the communications server the pooled resources for access and use by multiple cell sites in the second communication network;
informing the second server that use of allocated RF spectrum resources may begin for the wireless device to establish a communication connection with the second communication network; and
transmitting a communication message that includes information identifying a location and an amount of RF spectrum resources used by the wireless device.

6. A server computing device, comprising:
a processor configured with processor-executable instructions to perform operations comprising:
registering at least one parcel with at least a wireless telecom database in a dynamic spectrum arbitrage (DSA) system, wherein the DSA system includes components configured to establish a first communication link between a communications server and a first server in a first communication network, establish a second communication link between the communications server and a second server in a second communication network, and inform the second server whether use of allocated telecommunication resources may begin;
generating a plurality of telecom resource right (TRR) information structures that each include information identifying a registered parcel, a parcel owner, and an amount of a telecommunication resource of the first communication network that is offered for allocation and use by wireless devices of the second communication network with respect to a geographic area encompassing one cubic meter within the registered parcel;
combining the TRR information structures to encompass a geographic area larger than one cubic meter;
sending a message to the communications server that causes communications server to allocate the telecommunication resources identified in the combined TRR information structures from the first communication network for access and use by the wireless devices of the second telecommunication network;

receiving information identifying the amounts of the telecommunication resources used by the wireless devices of the second telecommunication network within each cubic meter of the geographic area encompassed by the combined TRR information structures; and updating a payment account associated with at least one parcel owner identified in the combined TRR information structures based on the amounts of the telecommunication resources used by the wireless devices of the second telecommunication network within each cubic meter of the geographic area encompassed by the combined TRR information structures.

7. The server computing device of claim 6, wherein the processor is configured with processor-executable instructions to perform operations such that combining the TRR information structures to encompass a geographic area larger than one cubic meter comprises combining the TRR information structures to cover a volume that encompasses a right of way or easement corridor through a series of registered parcels; and wherein the processor is configured with processor-executable instructions to perform operations further comprising offering the combined TRR information structures for purchase, lease, or trade on a telecommunications commodities exchange.

8. The server computing device of claim 7, wherein the processor is configured with processor-executable instructions to perform operations such that offering the combined TRR information structures for purchase, lease, or trade on the telecommunications commodities exchange comprises:

determining whether the identified telecommunication resource is available for allocation based on information received via the communication link;

broadcasting a communication signal that includes information for informing a plurality of communication networks that the identified telecommunication resource is available for allocation via an auction and including an auction start time for the auction;

receiving bids from the plurality of communication networks for the identified telecommunication resource determined to be available for allocation in response to broadcasting the communication signal and after the auction start time included in the broadcast communication signal;

allocating the identified telecommunication resource of the first communication network for access and use by the second communication network in the plurality of communication networks based on accepted bids;

sending a communication message to the second communication network, the communication message including information for informing the second communication network that use of the allocated identified telecommunication resource may begin;

recording a transaction in a transaction database identifying the identified telecommunication resource as being allocated for use by the second communication network; and transmitting another communication message that includes information identifying locations and amounts of the identified telecommunication resource used by the wireless devices in the second communication network.

9. The server computing device of claim 6, wherein the processor is configured with processor-executable instructions to perform operations such that sending the message to the communications server that causes the processor of the communications server to allocate the telecommunication resources identified in the combined TRR information structures from the first communication network for access and use by the wireless devices of the second telecommunication network further comprises:

receiving a request for telecommunication resources from the second server;

determining an amount of telecommunication resources available for allocation within the first communication network;

allocating a portion of the available telecommunication resources of the first communication network for access and use by multiple cell sites in the second communication network;

informing the second server that use of allocated telecommunication resources may begin; and transmitting a communication message that includes information identifying locations and amounts of the telecommunication resource used by the wireless devices in the second communication network.

10. The server computing device of claim 6, wherein the processor is configured with processor-executable instructions to perform operations such that sending the message to the communications server that causes the processor of the communications server to allocate the telecommunication resources identified in the combined TRR information structures from the first communication network for access and use by the wireless devices of the second telecommunication network further comprises:

receiving a request for RF spectrum resources from the second server;

sending a query message to the first server in the first communication network and at least one other server in another communication network based on a pre-defined criteria including a type, capability, and geographic criterion of the wireless device in response to receiving the request for RF spectrum resources from the second server;

receiving a message from the first server in response to sending the query message, the received message identifying an amount of first communication network RF spectrum resources available for reallocation;

pooling the first communication network RF spectrum resources identified in the received message and RF spectrum resources of at least one other communication network;

allocating the pooled resources for access and use by multiple cell sites in the second communication network;

informing the second server that use of allocated RF spectrum resources may begin for the wireless device to establish a communication connection with the second communication network; and transmitting a communication message that includes information identifying a location and an amount of RF spectrum resources used by the wireless device.

11. A non-transitory computer readable storage medium having stored thereon processor-executable software instructions configured to cause a processor to perform operations comprising:

registering at least one parcel with at least a wireless telecom database in a dynamic spectrum arbitrage (DSA) system, wherein the DSA system includes components configured to establish a first communication link between a communications server and a first server in a first communication network, establish a second communication link between the communications server and a second server in a second communication network, and inform the second server whether use of allocated telecommunication resources may begin;

generating a plurality of telecom resource right (TRR) information structures that each include information identifying a registered parcel, a parcel owner, and an amount of a telecommunication resource of the first communication network that is offered for allocation and use by wireless devices of the second communication network with respect to a geographic area encompassing one cubic meter within the registered parcel;

combining the TRR information structures to encompass a geographic area larger than one cubic meter;

sending a message to the communications server that causes communications server to allocate the telecommunication resources identified in the combined TRR information structures from the first communication network for access and use by the wireless devices of the second telecommunication network;

receiving information identifying the amounts of the telecommunication resources used by the wireless devices of the second telecommunication network within each cubic meter of the geographic area encompassed by the combined TRR information structures; and updating a payment account associated with at least one parcel owner identified in the combined TRR information structures based on the amounts of the telecommunication resources used by the wireless devices of the second telecommunication network within each cubic meter of the geographic area encompassed by the combined TRR information structures.

12. The non-transitory computer readable storage medium of claim 11, wherein the stored processor-executable software instructions are configured to cause a processor to perform operations such that combining the TRR information structures to encompass a geographic area larger than one cubic meter comprises combining the TRR information structures to cover a volume that encompasses a right of way or easement corridor through a series of registered parcels; and wherein the stored processor-executable software instructions are configured to cause a processor to perform operations further comprising offering the combined TRR information structures for purchase, lease, or trade on a telecommunications commodities exchange.

13. The non-transitory computer readable storage medium of claim 12, wherein the stored processor-executable software instructions are configured to cause a processor to perform operations such that offering the combined TRR information structures for purchase, lease, or trade on the telecommunications commodities exchange comprises:

determining whether the identified telecommunication resource is available for allocation based on information received via the communication link;

broadcasting a communication signal that includes information for informing a plurality of communication networks that the identified telecommunication resource is available for allocation via an auction and including an auction start time for the auction;

receiving bids from the plurality of communication networks for the identified telecommunication resource determined to be available for allocation in response to broadcasting the communication signal and after the auction start time included in the broadcast communication signal;

allocating the identified telecommunication resource of the first communication network for access and use by the second communication network in the plurality of communication networks based on accepted bids;

sending a communication message to the second communication network, the communication message including information for informing the second communication network that use of the allocated identified telecommunication resource may begin;

recording a transaction in a transaction database identifying the identified telecommunication resource as being allocated for use by the second communication network; and transmitting another communication message that includes information identifying locations and amounts of the identified telecommunication resource used by the wireless devices in the second communication network.

14. The non-transitory computer readable storage medium of claim 11, wherein the stored processor-executable software instructions are configured to cause a processor to perform operations such that sending the message to the communications server that causes the processor of the communications server to allocate the telecommunication resources identified in the combined TRR information structures from the first communication network for access and use by the wireless devices of the second telecommunication network further comprises:

receiving a request for telecommunication resources from the second server;

determining an amount of telecommunication resources available for allocation within the first communication network;

allocating a portion of the available telecommunication resources of the first communication network for access and use by multiple cell sites in the second communication network;

informing the second server that use of allocated telecommunication resources may begin; and transmitting a communication message that includes information identifying locations and amounts of the telecommunication resource used by the wireless devices in the second communication network.

15. The non-transitory computer readable storage medium of claim 11, wherein the stored processor-executable software instructions are configured to cause a processor to perform operations such that sending the message to the communications server that causes the processor of the communications server to allocate the telecommunication resources identified in the combined TRR information structures from the first communication network for access and use by the wireless devices of the second telecommunication network further comprises:

receiving a request for RF spectrum resources from the second server;

sending a query message to the first server in the first communication network and at least one other server in another communication network based on a pre-defined criteria including a type, capability, and geographic criterion of the wireless device in response to receiving the request for RF spectrum resources from the second server;

receiving a message from the first server in response to sending the query message, the received message identifying an amount of first communication network RF spectrum resources available for reallocation;

pooling the first communication network RF spectrum resources identified in the received message and RF spectrum resources of at least one other communication network;

allocating the pooled resources for access and use by multiple cell sites in the second communication network;

informing the second server that use of allocated RF spectrum resources may begin for the wireless device to establish a communication connection with the second communication network; and transmitting a communication message that includes information identifying a location and an amount of RF spectrum resources used by the wireless device.

\* \* \* \* \*